United States Patent [19]

Kitai et al.

[11] 4,019,189
[45] Apr. 19, 1977

[54] DIGITAL EXPOSURE TIME CONTROL CIRCUIT WITH SELF-TIMER

[75] Inventors: Kiyoshi Kitai, Tokyo; Takeo Saito, Dainichi Yotsukaido; Youichi Seki, Chiba, all of Japan

[73] Assignee: Seiko Koki Kabushiki Kaisha, Japan

[22] Filed: Feb. 14, 1975

[21] Appl. No.: 550,030

[30] Foreign Application Priority Data

Feb. 18, 1974 Japan .............................. 49-19272

[52] U.S. Cl. .............................. 354/23 D; 354/50; 354/238
[51] Int. Cl.² ........................ G03B 7/08; G03B 9/64
[58] Field of Search ............ 354/23 D, 237–238, 354/50, 51, 60 R

[56] References Cited

UNITED STATES PATENTS 3,641,902   2/1972   Kikuchi et al. ...................... 354/51

FOREIGN PATENTS OR APPLICATIONS 1,196,072   7/1965   Germany ......................... 354/23 D

*Primary Examiner*—L. T. Hix
*Assistant Examiner*—J. A. LaBarre
*Attorney, Agent, or Firm*—Robert E. Burns; Emmanuel J. Lobato; Bruce L. Adams

[57] ABSTRACT

A digital exposure time control circuit including a standard pulse generating circuit for developing standard rate pulses which are applied under control of a brightness-time conversion circuit to a dividing circuit, and subsequently counted in a reversible counter operating in a counting mode. The number of standard pulses counted are controlled by the brightness-time conversion circuit to be proportional to an exposure time, and the counted pulses are subsequently read-out from the counter to control exposure time. The exposure time control circuit also includes a self-timer control circuit which is responsive to a predetermined number of counted pulses to clear the reversible counter, and enable the brightness-time conversion circuit when the number of counted pulses exceeds the predetermined number in order to develop a delay time, determined by the predetermined number of pulses to which the self-timer is responsive, before the start of counting the pulses for controlling exposure time.

1 Claim, 9 Drawing Figures

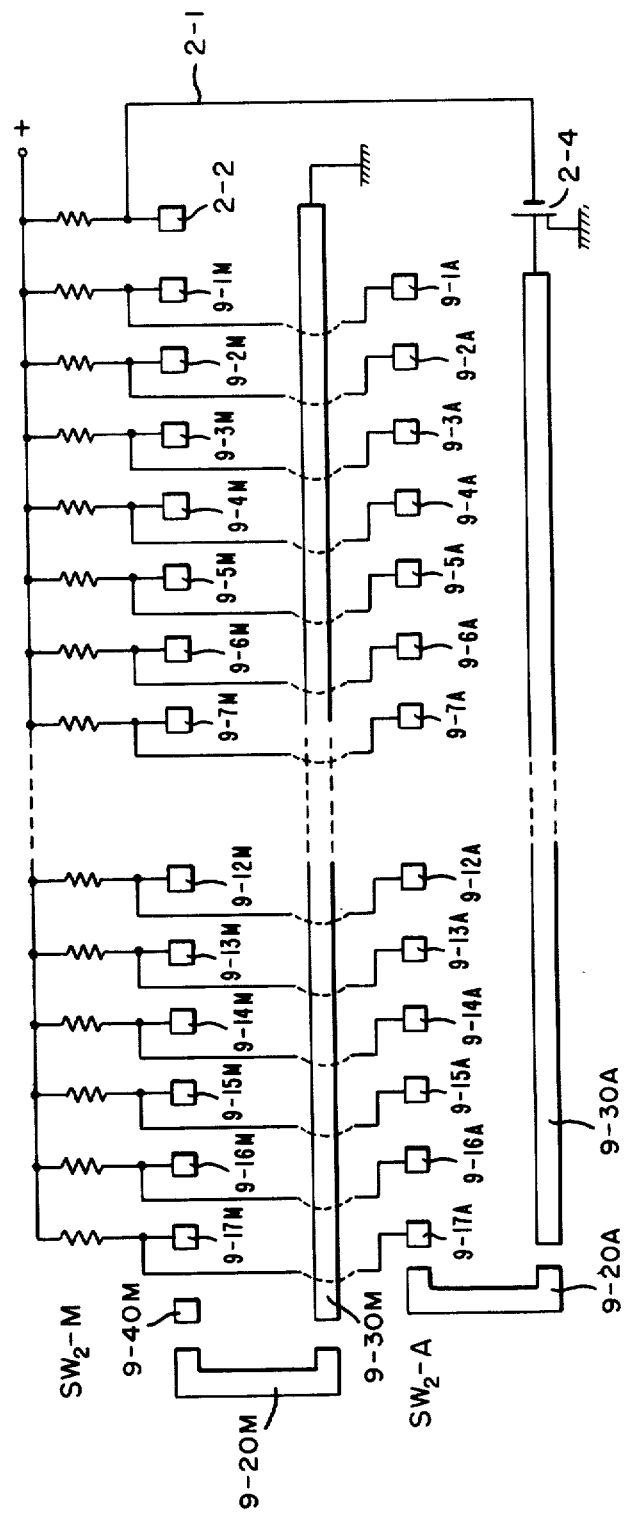

DIGITAL EXPOSURE TIME CONTROL CIRCUIT WITH SELF-TIMER

The known electric self-timer circuit of exterior photometric type exposure time control circuit is provided with a delay circuit consisting of condensers, resistors, and other analog components separate from the exposure time control circuit. Camera operation actuates the delay circuit for the self-timer when the self-timer is employed, demagnetizes (excites) the electromagnet for controlling the self-timer time when the self-timer time is ended, mechanically transfers a change-over switch from the delay circuit for the self-timer to the exposure time control circuit by a well-known means, simultaneously opens the shutter blade, and after effecting exposure allows the electromagnet for exposure time control to be demagnetized (excited) thereby closing the shutter blade.

For the electric self-timer circuit of an internal photometric type electric shutter control circuit, however no consideration has hitherto been given as to whether the time of exposure is controlled by an analog means or whether it is digitally controlled. From this viewpoint, an addition of an electric self-timer to the internal photometric type electric shutter control circuit may, for example, as in the electric self-timer circuit of the above-said external photometric type electric shutter control circuit wherein the delay circuit for self-timer is separate from the exposure time control circuit, and after elapse of self-timer time, the change-over switch is made to transfer to the exposure time control circuit by a signal generated upon demagnetization (exciting) of the electromagnet for controlling self-timer time thereby to effect memorizing the brightness of a subject and causing the view finder mirror's up going motion. When the mirror goes up, for example, in the case of a focal-plane shutter, exposure is completed by allowing the front shutter curtain to travel first for effecting exposure, and then by travelling the back shutter curtain as the electromagnet for controlling the time of exposure is demagnetized (excited). However, the self-timer circuit system applying the above-said method must also be provided with the delay circuit for the self-timer besides the exposure time control circuit, and since the self-timer time is normally approximately ten seconds, not only the condenser with a high capacitance is required, but the space convenience and cost requirements may be prohibitive. An electric shutter circuit using this type of memory reproducing system is often integrated, usually because it is complicated. And, it is now almost impossible to provide a condenser having a high capacitance in an integrated circuit. As described above, moreover, any bounce of the change-over switch inevitably occurs when the change-over switch is transfered from the self-timer circuit to the exposure time control circuit by a signal obtainable from the electromagnet for controlling self-timer time at the completion of self-timer operation and will cause a big error in subsequent memory actions so that the most reliable changeover switch will be required. Besides, there is a defect such that if memory action is made before completion of memorization when the memory time is long, because the change-over switch is mechanically transfered from the delay circuit for the self-timer to the exposure time control circuit by a signal obtained from the electromagnet for controlling self-timer time control mirror-up movement will begin at the same time and the exposure time control circuit will remain in the memory mode.

The present invention eliminates the above-said defect with an exposure time control circuit for a camera electric shutter, with a self-timer in the electric shutter control circuit which is of the type having a digital control circuit which is of the type having a digital memory reproducing system in which pulses generated in a pulse generating circuit are memorized in a counting circuit by counting a number which corresponds to the brightness of a subject, and the time of exposure is controlled according to the memory content memorized in the counting circuit in synchronism with the start of shutter actuation. Standard pulses with a given frequency generated in the pulse generating circuit are divided through the counting circuit when the self-timer is operative and memorized after during an elapse of actuating time by the self-timer. Then a signal for starting the shutter opening is generated at the completion time of memorization.

The embodiment of the present invention is based upon the exposure time control circuit for electric shutter using a digital memory reproducing system being proposed under the patent application Nos. Sho 48-95005, Sho 48-95006, Sho 48-95007 and Sho 48-95008 by this applicant, to which the self-timer circuit is added.

A BRIEF DESCRIPTION OF REFERENCE DRAWINGS

FIG. 3 shows the structure of change-over switches in the said embodiment.

FIG. 5 thru FIG. 8 are timing diagrams showing the actuating state and signal levels relative to respective switches, circuits, signals during operation of the said embodiments.

DESCRIPTION OF THE PREFERRED EMBODIMENT

Figure 1:
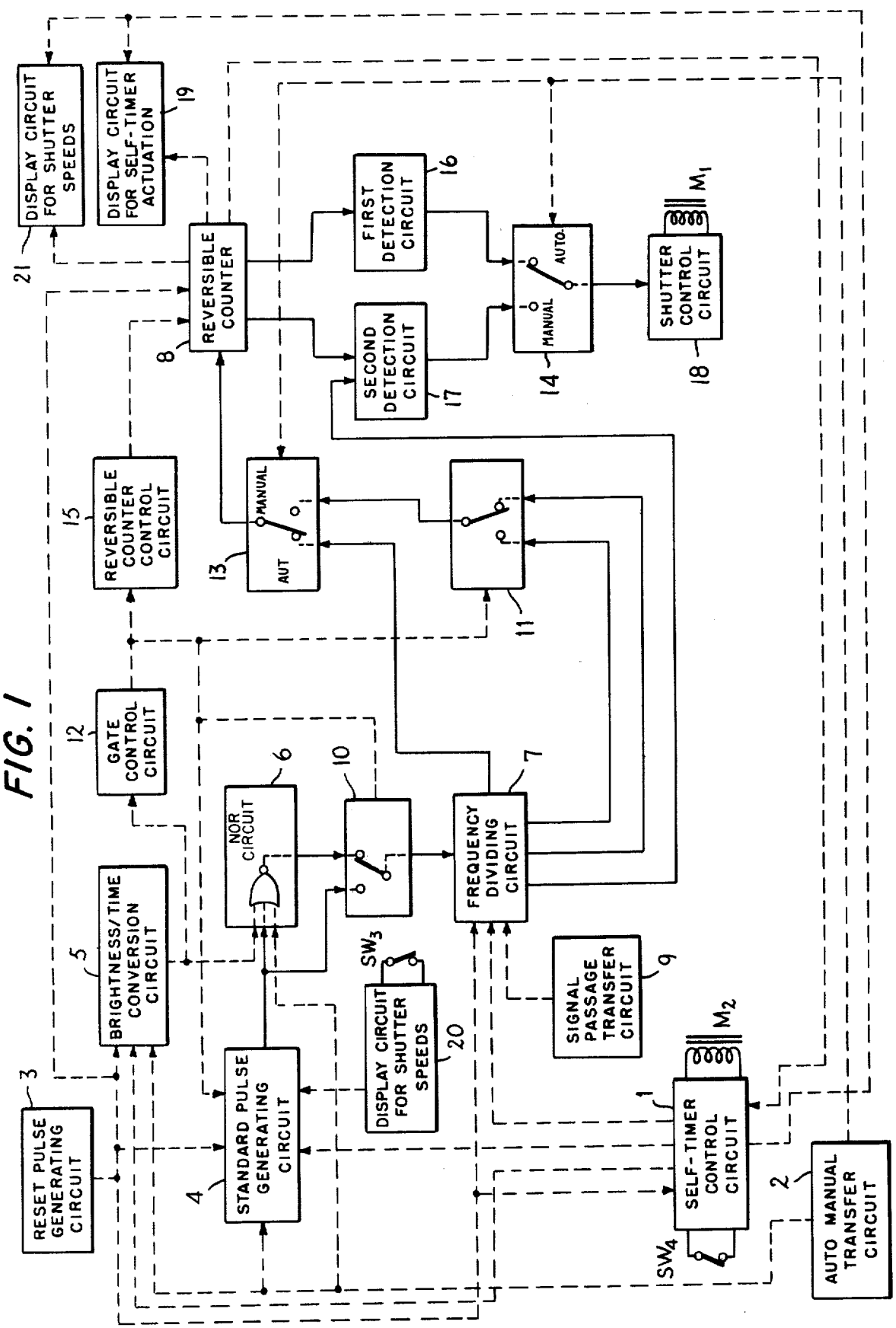
FIG. 1 is block diagram showing the structure of the present invention.

FIG. 1 is block diagram showing the composition of this embodiment, in which 1 is a self-timer switch SW4 to close only when the self-timer lever (not shown) is set while the self-timer is in use and self-timer control circuit includes electromagnet M2 for controlling self-timer time. 2 is an auto manual transfer circuit including a change-over switch for use in selecting the automatic setting of exposure time or the manual setting of exposure time. 3 is a reset pulse generating circuit for generating reset pulses in synchronism with current supply. 4 is a standard pulse generating circuit for generating the standard pulses with a certain given frequency. 5 is a brightness time conversation circuit by which, in case of automatic setting of exposure time, the intensity of light passing through a photographing lens is measured with a photoconductive cell, i.e., CdS thereby generating single pulses having the pulse width corresponding to the brightness of a subject and by which, in case of manual setting of exposure time, signals independent of the brightness of a subject are generated in synchronism with a supply of power. (The automatic setting of exposure time is referred to as Automatic Setting and the manual setting of exposure time as Manual Setting hereunder). 6 is a circuit through which, in case of automatic setting, standard pulses generated from the standard pulse generating circuit 4 are permitted to pass during generation of single pulses across the output of the brightness time conversion circuit 5. 7 is a frequency dividing circuit which, in case of automatic setting, introduces other factors for determinging the time of exposure than the brightness of a subject at the time of memorizing and divides standard pulses only through the number of its present stages at the time of calling or memory read out and which, in case of manual setting, delivers standard pulses as inputs to the reversible counter 8 after they pass through all the dividing circuit stages and are divided. 8 is a reversible counter which adds and memorizes the number of input pulses when an addition control signal is being given by the reversible counter control circuit 15 and which in turn substracts the memorized number of pulses by the number of input pulses when a subtraction control signal is being given by the counter control circuit. 9 is a signal passage transfer circuit, provided with a plurality of control terminals which, in case of automatic setting, is employed to introduce other factors for determining the time of exposure than the brightness of a subject and which, if a control terminal is selected by the above-said other factor, delivers standard pulses between the counting stages of reversible counter 8 or to the reversible counter 8 through frequency dividing circuit 7 in correspondence thereto.

In case of manual setting, if a control terminal is selected according to a manual set value, the standard pulses divided through frequency dividing circuit 7 and reversible counter 8 are sent from the frequency dividing circuit 7 or from the reversible counter 8 to the second detection circuit 17. 10, 11 are memory call-up transfer gate circuits, the circuits that transfer the routes along which pulses pass at the time of memorizing and calling, and are controllable by gate control circuit 12. And, in case of manual setting which does not perform memory actuation, they are changed over to the pulse route at the time of calling or reading out. 12 is a gate control circuit for generating signals to control memory call-up transfer gate circuits 10, 11, 13 and 14 which are auto manual transfer gate circuits for changing pulse routes at the time of automatic or manual setting, and are controllable by auto manual transfer circuit 2. 15 is a reversible counter control circuit for giving an addition control signal or a subtraction control signal to reversible counter 8, and is controllable by gate signals of gate control circuit 12. 16 is the first detection circuit that detects the point at which the memory value or memory contents of reversible counter 8 becomes zero in case of automatic setting thereby generating a shutter closing signal. 17 is the second detection circuit which generates a shutter closing signal in case of manual setting when it detects in the counter 8 the number of pulses corresponding to the set value so made by manual setting. 18 is a shutter control circuit including electromagnet (M1). 19 is a display circuit for the actuation of self-timer to actuate when the self-timer is activated. 21 is a display circuit for displaying shutter speeds.

Next, a brief description is made regarding operation. An explanation is first given in regard to the automatic setting of exposure time where the self-timer is not used, in which case, the self-timer switch SW4 is open and self-time control circuit 1 does not affect operation. And, if setting is made to Automatic in the auto manual transfer circuit 2, then the pulse route for automatic setting is selected in the auto manual transfer gate circuits 13, 14. When power switch SW1 is closed by depressing a camera release, and current is supplied to the whole system, an addition control signal is given from the reversible counter control circuit 15 to the reversible counter 8, simultaneously the reversible counter 8 and the frequency dividing circuit 7 are then reset by reset pulses being generated from the reset pulse generating circuit 3.

The standard pulses generated from the standard pulse generating circuit 4 by the trailing edge of the reset pulse also pass across NOR circuit 6 and memory call-up transfer gate circuit 10 during the pulse width of single pulses being generated from the brightness time conversion circuit 5, and are properly divided through frequency dividing circuit 7 by the signal passage transfer circuit 9 selected by factors for determining the time of exposure other than the brightness of a subject such as film sensitivity, diaphragm openings, etc. They are also added or memorized by reversible counter 8 through memory call-up transfer gate circuit 11 and auto manual transfer gate circuit 13 or they are added or memorized directly by reversible counter 8 through the single passage transfer circuit 9. The memory value thus memorized controls the display circuit 21 for shutter speeds and displays shutter speed. At the completion time of single pulses of the brightness time conversion circuit 5, gate control circuit 12 is controlled by the trailing edge of the single pulse, and memory call-up transfer gate circuits 10, 11 are made to transfer by memory call-up transfer signals generated in the gate control circuit 12, simultaneously controlling reversible counter control circuit 15 and giving a subtraction control signal to the reversible counter 8 to allow it to be in the state ready for controlling substraction, and thereby stopping the occurrence of standard pulses in the standard pulse generating circuit 4.

Operations up to this time are made, for the single-lens reflex camera, before the mirror for the view finder rises after camera release button is depressed and the light falling on the photoconductive cell is interrupted. If the shutter starts opening upon further depression of the camera release button, timing switch SW3 is opened by a shutter blade opening member (not shown), generating standard pulses again in the standard pulse generating circuit 4 after elapse of a given time determined by delay circuit 20 and also resetting the display of shutter speed then being displayed by the display circuit 21 for shutter speeds. The standard pulses produced again pass along memory call-up transfer gate circuit 10, and after being divided by frequency dividing circuit 7, are given as inputs to reversible counter 8 through memory call-up transfer gate circuit 11 and auto manual transfer gate circuit 13, where they subtract the memory values being memorized in turn, and when the memory value becomes zero the first detection circuit 16 detects this condition. A shutter closing signal generated in the first detection circuit 16 controls shutter control circuit 18, interrupts the current of electromagnet M1 locking the shutter blade closing member (not shown) and releases the shutter blade closing member, thus closing the shutter.

In case of manual setting where self-timer is not employed, the self-timer switch SW4 is then open and auto manual transfer gate circuits 13, 14 are transfered to the pulse route for manual setting upon selection of a manual set value, and reversible counter 8 is connected longitudinal to frequency dividing circuit 7. The standard pulse generated in the standard pulse generating circuit 4 are applied as inputs to reversible counter 8 after passing through all stages of the frequency dividing circuit 7. The display circuit 21 for shutter speed is constructed so that it may display a shutter speed preset by manual setting as will be described later. If the power switch is closed by depressing camera release, reversible counter control circuit 15 gives an addition control signal to reversible counter 8 similarly as in automatic setting, and then reversible counter 8 and frequency dividing circuit 7 are reset by reset pulses being generated in the reset pulse generating circuit 3. And, output signals from the brightness time conversion circuit 5 become signals equivalent to those at the completion time of single pulses by signals of the auto manual transfer circuit, by which gate control circuit 12 is controlled, transfering memory call-up transfer gate circuits 10, 11 by memory call-up transfer signals generated from the gate control circuit 12 and thus holding a state for addition control at the same time while controlling the reversible counter control circuit 15. Then, the mirror for the view finder goes up and the shutter starts opening with timing switch SW3 activated to open by depressing the camera release more, and standard pulses are generated in the standard pulse generating circuit 4 after delay for a given time by delay circuit 20. The standard pulses thus generated are delivered as inputs to the frequency dividing circuit 7 by way of the memory call-up transfer gate 10, and after passing all dividing stages of the frequency dividing circuit 7, they are given as inputs through auto manual transfer gate circuit 13 to reversible counter 8, where they are divided. The standard pulses divided are then sent to the second detection circuit 17 by a control terminal selected according to a manual set value, transmitting a shutter closing signal to the shutter control circuit 18, which in turn cuts off the current of electromagnet M1 thereby closing the shutter. If this self-timer is not employed, on the otherhand, the display circuit 19 for actuation of the self-timer is kept inoperative.

Next, an explanation is made regarding the case in which the self-timer is used. The self-timer of the present invention is constructed such that the standard pulses to be generated in the standard pulse generating circuit 4 are divided through frequency dividing circuit 7 connected in cascade thereto and are then applied to reversible counter 8, and the time of self-timer is counted while simultaneously display is made by the display circuit 19 for actuation of the self-timer. Accordingly, the respective circuits are arranged to deliver output signals that can actuate the self-timer by signals of the self-timer control circuit 1 when the self-timer is activated.

An explanation is given first referring to automatic setting. If self-timer lever (not shown) is set, self-timer switch SW4 is then closed and self-timer control circuit 1 is ready for operation, and auto manual transfer circuit 2 is also set to automatic setting. By pressing down the camera release, the power switch is made to close and reset pulses are generated in the reset pulse generating circuit 3 concurrently with a supply of power, and frequency dividing circuit 7 and reversible counter 8 are reset. And, control signals are then given from the self-timer control circuit 1 to respective circuits, and reversible counter 8 is ready for controlling addition, memory call-up transfer gate circuit 10 is transfered to the route at the time of calling, and auto manual transfer gate circuit 13 is transfered to the route at the time of manual operation thereby connecting frequency dividing circuit 7 and reversible counter 8 in cascade. Simultaneously output signals from the first detection circuit 16 and the second detection circuit 17 will no longer be transmitted to shutter control circuit 18, and consequently electromagnet M1 is not excited. At this time the electromagnet M2 for actuation of the self-timer is being excited. After completion of generation of the above-said reset pulse, standard pulses start being generated in the standard pulse generating circuit 4 by the trailing edge of the said pulse and standard pulses so generated are divided through memory call-up transfer gate circuit 10 and frequency dividing circuit 7 and then given as inputs to reversible counter 8 by way of auto manual transfer gate circuit 13, where they are further divided. Then a predetermined time of the self-timer is counted, and after completion of the counting time, the self-timer control circuit 1 generates a completion signal for the self-timer. Meanwhile, the display circuit 19 for actuation of the self-timer displays the actuation of the self-timer while the self-timer completion signal is generated, during which the display circuit 21 for shutter speeds if left inoperative. The self-timer completion signal to be generated from the self-timer control circuit 1 controls respective circuits, stops generation of standard pulses in the standard pulse generating circuit 4, transfers memory call-up transfer gate circuit 10 to the route for memorizing and transfers auto manual transfer gate circuit 13 to the route for automatic setting, thus allowing the output of the first detection circuit 16 to be transmitted to shutter control circuit 18 and thereby exciting electromagnet M1. The self-timer completion signal renders the display circuit 19 for actuation of the self-timer inoperative and allows the display circuit 21 for shutter speeds to operate. When a self-timer completion signal is given, a reset pulse is generated in the self-timer control circuit 1, whereby frequency dividing circuit 7 and reversible counter 8 are reset.

Standard pulses being generated from the standard pulse generating circuit 4 by the trailing edge of the reset pulse at the completion of this reset pulse pass across NOR circuit 6 and memory call-up transfer gate circuit 10 during the pulse width of single pulses generated from brightness time conversion circuit 5 and are properly divided through frequency dividing circuit 7 by the signal passage transfer circuit 9 selected by determinant factors for the time of exposure other than the brightness of a subject, such as film sensitivity, diaphragm openings,. etc. And, they are further added and memorized by reversible counter 8 through memory call-up transfer gate circuit 11 and auto manual transfer gate circuit 13 or they are added and memorized directly by reversible counter 8 through the signal passage transfer circuit 9. The memory value thus memorized controls the display circuit 21 for shutter speeds thereby displaying shutter speed. Gate control circuit 12 is controlled by the trailing edge of single pulses at the completion of single pulses in the brightness time conversion circuit 5, and memory call-up transfer signals generated in the gate control signal applied to reversible counter 8 for being ready for controlling substraction thereby stop generation of standard pulses in the standard pulse generating circuit 4. The electromagnet M2 of self-time control circuit 1 is also demagnetized at this time. The view finder mirror then starts rising upon demagnetization of electromagnet M2 and when it is up, timing switch SW3 is made to open allowing the shutter opening to start, thus commencing exposure. (A description is made on the coordinated action between the control circuit of the present invention and the shutter device in more detail using FIG. 2). An explanation in regard to the operations after that is omitted herein because they are exactly the same as automatic setting where the self-timer is not employed as set forth above. If the time of exposure is set to manual setting using the self-timer, the self-timer switch SW4 is closed as a self-timer lever is set and if, after a manual set value is selected the power switch is made to close by depressing the camera release, electromagnet M2 is excited as in automatic setting and the self-timer control circuit 1 then delivers a control signal to respective circuits to effect counting the time of self-timer and activating the display circuit 19 for actuation of self-timer. A self-timer completion signal is generated when the self-timer is completed actuating thereby stopping generation of standard pusles in the standard pulse generating circuit 4 and allowing the second detection circuit 17 to be ready for transmitting its output signals to the shutter control circuit 18, while magnetizing electromagnet M1. Furthermore, the self-timer completion signal resets frequency dividing circuit 7 and reversible counter 8 with reset pulses generated from the self-timer control circuit 1, and simultaneously controls respective circuits and transfer respective gate circuits to the route at the time of manual setting by means of which the output signals of gate control circuit 12 are also inverted and electromagnet M2 is demagnetized. As the electromagnet M2 is demagnetized, the view finds mirror goes up and timing switch SW3 is made to open starting exposure. The operation after opening of timing switch SW3 is the same as in the manual setting of exposure time in which the self-timer is not employed, and therefore, the explanation thereof is omitted herein.

Figure 2A:
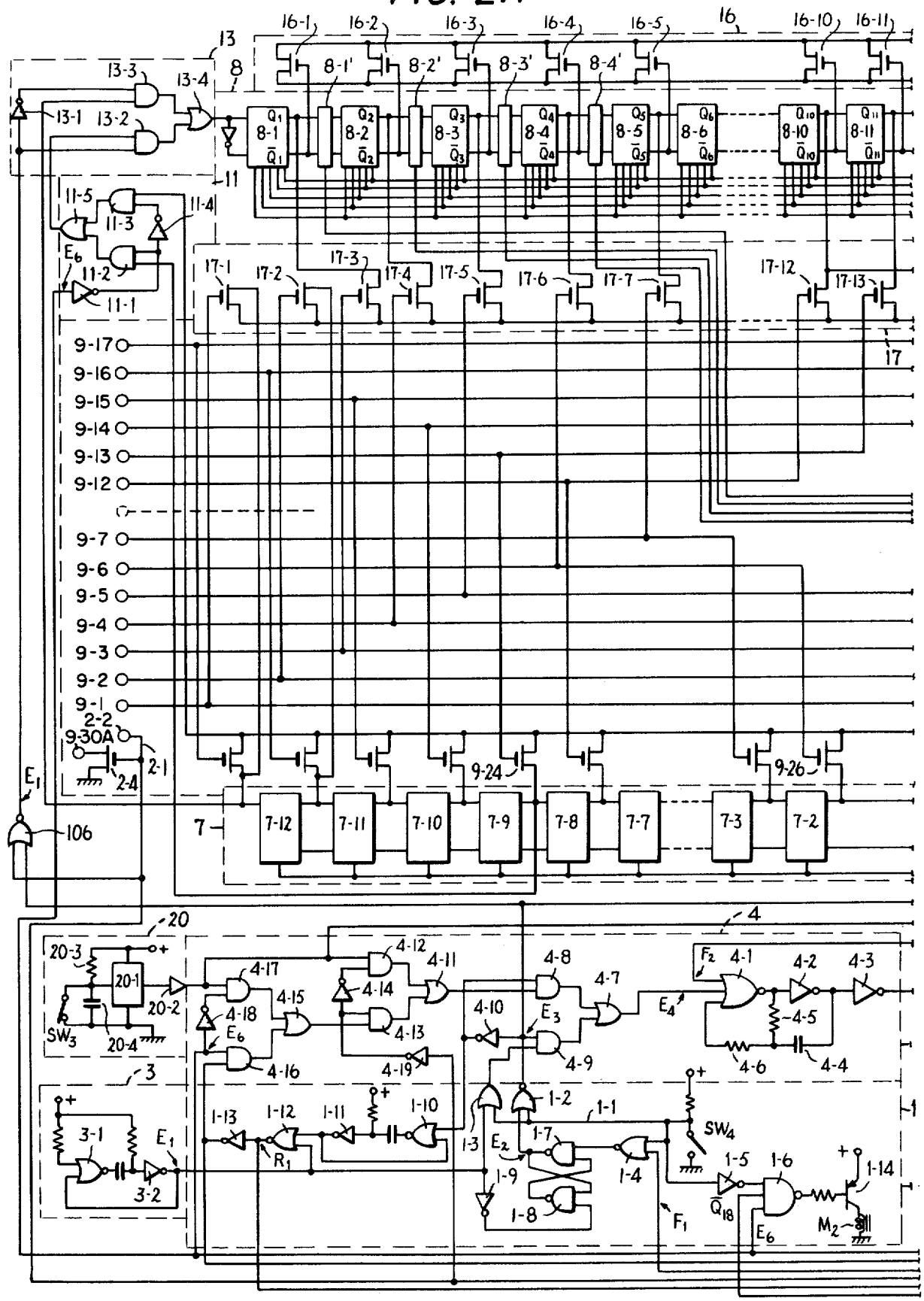
FIG. 2 shows an embodiment of the said block diagram.
Figure 2B:
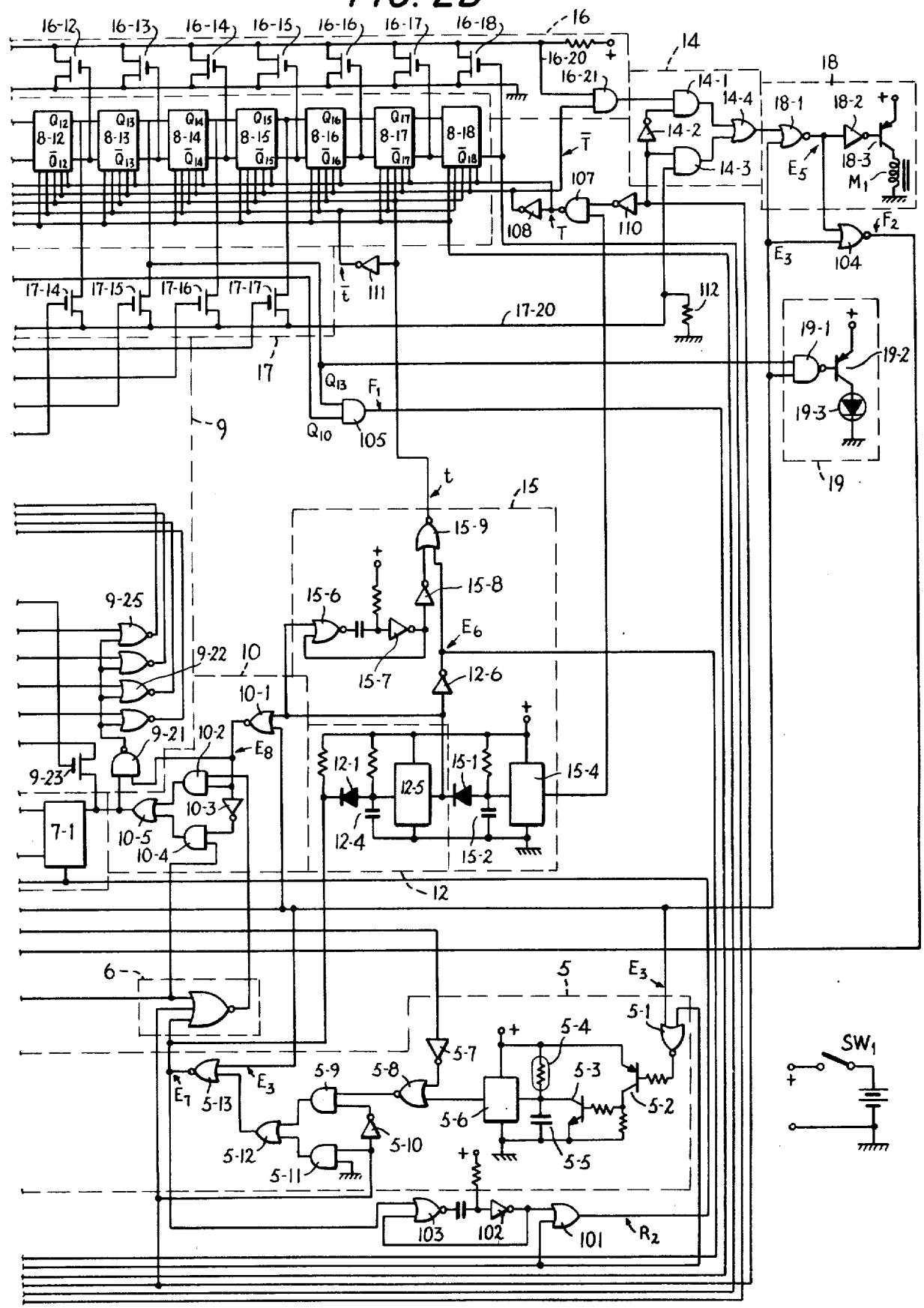

FIG. 2 is a circuit diagram of an embodiment respective blocks as described in conjunction with FIG. 1. The display circuit 21 for shutter speeds will be explained later. The operation of the present invention is described in conjunction with FIG. 2. 1 as used in the sentences hereunder will be referred to as a high level of signal level and 0 therein will mean the low level. For simplicity moreover, the shutter described is limited to a focal plane shutter. At first, an explanation is given in detail of the automatic setting in which the self-timer is used. Prior to photographing, the self-timer lever fitted on the camera is set to its self-timer position, thereby self-timer switch SW 4 is made to close. The movable contact piece 9—20 M (to be explained in conjunction with FIG. 3) to be moved by automatic and manual photographing transfer ring (not shown) is moved to the automatic photographing position of auto manual transfer circuit 2, namely to the position where control terminal 2—2 is earthed. The movable contact piece 9-20 A connected to diaphragm ring and film sensitivity set ring (not shown) is also moved properly dependent upon photographing conditions. Power switch SW1 is closed by a pin (not shown) whose shaft is fitted on release plate, when the camera release is pressed down and power is supplied to the respective circuits. By depressing the camera release more, the release plate is locked at its position by a lock lever (not shown) and even if the release button is reset to its previous position power switch SW1 will not be opened. Releasing the lock lever is accomplished in a known manner when mirror is returned to its previous position after exposure is finished. Since control terminal 2—2 is earthed as described above and self-timer switch SW4 is closed, both control line 2—1 and self-timer control line 1—1 are given 0 signals. Meanwhile, reset pulse generating circuit 3 composed of monostable multivibrator including NOR circuit 3-1, inverter 3-2, etc. causes positive single pulses to generate at its output E1 in synchronism with power switch SW1. While output E1 is 1, this signal makes its output R1 0 through NOR circuit 1-12 and resets reversible counter 8 (reversible counter is reset at 0) and also resets flip-flop circuit R-S consisting of NAND circuits 1-7, 1-8 by way of inverter 1-9 (This flip-flop circuit R-S will be explained in detail later), thereby making the output E2 of NAND circuit 1-7 0. Since the other input end of NOR circuit 1-2 is receptive of the 0 signal of self-timer control line 1—1, accordingly, its output E3 developes 0 signal as output. During a period of time in which output E1 is 1, the output R1 is 0 as mentioned above, and therefore, the output R2 of OR circuit 101 to which an output of inverter 1-13 is delivered as inout is given 1 signal as output to reset frequency dividing circuit 7 (The frequency dividing circuit 7 is reset at 1), and output E1 then being 1 is given as input to OR circuit 1-3 and delivers 1 signal to the input terminal E4 of NOR circuit 4-1 through AND circuit 4-9 and OR circuit 4-7. (Because, as set forth above already, output E3 receives a 1 signal the other input terminal of AND circuit 4-9 is 1) Since signals of output E3 are inputs to NOR circuits 5-1, 5-3, 10-1, 104, 106 all those outputs come to be 0. Accordingly, transistors 5-2, 5-3 of brightness time conversion circuit 5 will be rendered conductive and switching circuit 5-6 remains 0 as condenser 5-5 will not be changed. The outout E7 of NOR circuit 5-13 is an input to gate control circuit 12 with diode 12-1 being in a state of conductivity, and consequently condenser 12-4 will not be charged and switching circuit 12-5 develops a 0 output. Therefore, the output of switching circuit 15-4 is also 0, thereby output $\overline{T}$ of NAND circuit 107 becomes 1 and output T by way of inverter 108 becomes 0. In addition, the output of switching circuit 12-5 is delivered as input to NOR circuit 15-9 with its output E6 being "1" through inverter 12-6, and therefore, the output of NOR circuit 15-9 becomes 0 and output through inverter 111 1 thus given an additon control signal to reversible counter 8. A signal 1 of E3 is then an input to NOR circuit 104, the output F2 of which becomes "0" and is an input to NOR circuit 4-1. Since the signal 1 of E3 is also an input to the NOR circuit 18-1 of shutter control circuit 18 with its output E5 being 0 and is then applied to transistor 18-3 through inverter 18-2, transistor 18-3 is thereby rendered non-conductive and electromagnet M1 will not be excited. As described above, reversible counter 8 is reset while output E1 is 1, and the Q output of respective counting stages consisting of reversible bindary counting circuits becomes 0. As a result, the outout F1 of AND circuit 105 which obtains inputs from Q outputs of counting stages 8-10, 8-13 becomes 0, and the input F1 of NOR circuit 1-4 and other input is 0as set forth above, Consequently, its output becomes 1 to be another input for NAND circuit 1-7.

Here, an explanation is given of the R-S flip-flop circuit comprised of NAND circuits 1-7, 1-8.

Synchronously with a supply of power, NAND circuit 1-8 is then subjected to an input signal 1 from output E1 through inverter 1-9, making its output 1. Accordingly, input of NAND circuit 1-7 wired as show also becomes 1 and the output E2 comes to be 0. This signal is applied to NOR circuit 1-2, thus making both inputs of NOR circuit 1-2 0 and allowing output E3 to be 1. Each of the three input terminals for the NAND circuit 1-6 of self-timer control circuit 1 is subjected to an input of signal 1 inverted from a 0 signal of self-timer control line 1-1 through inverter 1-5, input E6 signal being a 1 signal and the Q18 signal being 1 and developed by the last counting stage 8-18 for reversible counter 8, and therefore, the output $\bar{Q}$ becomes 0, by which transistor 1-14 is rendered conductive and electromagnet M2 is then excited. Magnetizing this electromagnet M2 locks the mirror locking pawl (not shown) which is in the locking relation with the mirror driving member (not shown) for allowing the mirror to rise. Since the mirror locking pawl is moved substantially by release a plate at the last stage of the depressing storke by release plate it is normally locked by electromagnet M2 and, the mirror will not start going up even when the release plate is being depressed.

Although the electromagnet M1 for locking the travel of the shutter back curtain is then being demagnetized, no trouble will be caused in photographing only by adoption of a well-known method, for example, merely by hindering the travel of the back curtain with a holding lever, etc. (not shown) before the mirror's up-going movement. The NOR circuit 1-10 of self-timer control circuit 1 constitutes monostable multivibrator together with inverter 1-11. The monostable a is triggered when the outout of inverter 4-10 becomes 1 namely, as E3 first becomes 0 and maintains the output of inverter 1-11 at 0 in the case the outout of inverter 4-10 0.

Next, an explanation is made in regard to an occasion when the output E1 of reset pulse generating circuit 3 becomes 0. The output R1 if NOR circuit 1-12 then becomes 1, releases reversible counter 8 from being reset and is delivered as input to OR circuit 101 through inverter 1-13, allowing the output R2 to be 0 and thereby releasing frequency dividing circuit 7 from its reset state. And, the other input of OR circuit 101 is subjected to 0 as an input (Because the output E7 of NOR circuit 5-13 is 0 as described above, and consequently, the monostable multivibrator consisting of NOR circuit 103, inverter 102, etc, will not be triggered.) Concurrent with releasing of reversible counter 8 and frequency dividing circuit 7 from being reset, the output of OR circuit 1-3 also becomes 0, and the outputs of AND circuit 4-9, OR circuit 4-7 becomes 0", and one input signal E4 of NOR circuit 4-1 becomes 0, whereby the pulse generating circuit made up of NOR circuit 4-1, inverters, 4-2, 4-3, condenser 4-4 and resistors 4-5, 4-6 starts generating standard pulses. The frequency of a standard pulse to be produced here is substantially determined by condenser 4-4 and resistor 4-5. For convenience of explanations to be made later, moreover, the frequency of the standard pulses is assumed to be 2.048 MHz. These standard pulses are inputs to NOR circuit 6 and AND circuit 10-4 of memory call-up transfer gate circuit 10. Since the NOR circuit 6 is given a 0 signal of control line 2-1 and a 0 signal of output E7 for NOR circuit 5-13, standard pulses can pass NOR circuit 6 but not AND circuit 10-2 because the output E8 of NOR circuit 10-1 in memory call-up transfer gate circuit 10 is 0 (E3 is 1 and output of switching circuit 12-5 is 0). Furthermore, as the AND circuit 10-4 of memory call-up transfer gate circuit 10 receives a 1 signal inout inverted from the 0 signal of output E8 for NOR circuit 10-1 by way of inverter 10-3, standard pulses being given as input to other input terminals are then delivered as inputs to frequency dividing circuit 7 and the NAND circuit 9-21 of signal passage transfer circuit 9 after passing the AND circuit 10-4 and OR circuit 10-5. Since the outout E8 of NOR circuit 10-1 in memory call-up transfer gate circuit 10 is applied to NAND circuit 9-21, the standard pulses passed along OR circuit 10-5 will not pass NAND circuit 9-21. As will be explained later, standard pulses divided through frequency dividing circuit 7 are also delivered as inputs through signal passage transfer circuit 9 to the AND circuit 11-3 of memory call-up transfer gate circuit 11. At this time, a 1 signal of output E6 of inverter 12-6 for gate control circuit 12 is applied to the inverter 11-1 of memory call-up transfer gate 11 and also 1 signal is delivered as input through inverter 11-1, 11-4 to the other input of AND circuit 11-3 for memory call-up transfer gate circuit 11. Therefore, standard pulses divided by frequency dividing circuit 7 pass along OR circuit 11-5 and are inputs to the AND circuit 13-2 of auto manual transfer gate circuit 13. Moreover, the AND circuit 11-2 of memory/call-up transfer gate circuit 11 has a 0 signal input at one input with its output as 0 regardless of the signal being given as input to other input of this AND circuit 11-2.

Although the output of the last dividing stage of frequency dividing circuit 7 is an input to the AND circuit 13 of auto/manual transfer gate circuit 13, the output E9 of NOR circuit 106 is then 0 as mentioned above, and this 0 signal is sent as an input directly to AND circuit 13-2 and cuts off this AND circuit 13-2, and this 0 signal is in turn delivered as an input to AND circuit 13-3 through inverter 13-1, allowing input signals to be delivered to other inputs of AND circuit 13-3 to pass. Accordingly, the output of the last dividing stage of frequency dividing circuit 7 is applied as an input through the AND circuit 13-3, OR circuit 13-4 of auto/manual transfer gate circuit 13 to reversible counter 8, by means of which standard pulses to be produced by the standard pulse generating circuit composed of NOR circuit 4-1 of standard pulse generating circuit 4 and inverters 4-2, 4-4, etc. are to be divided one after another by frequency dividing circuit 7 connected in cascade thereto and to reversible counter 8. The number of frequency dividing stages stages for frequency dividing circuit 7 and the number of counting stages for reversible counter 8 should be respectively 12 frequency dividing stages 18 and counting stages though they are partially omitted in the reference drawings. If a frequency of 2.048 MHz is divided, the Q output of counting stage 8-10 for reversible counter 8 in inverted from 0 to 1 second after start of oscillation, and after 8 seconds the Q output of counting stage 8-13 is inverted from 0 to 1, in which case, the input signal Q 13 of self-timer display circuit 19 consisting of NAND circuit 19-1, transistor 19-2 and light emitting diode 19-3 is then inverted from 0 to 1, making the output of NAND circuit 19-1 0. Consequently transistor 19-2 is rendered conductive and light emitting diode 19-3 becomes luminous. The action of this light emitting diode 19-3 indicates completion of self-timer time beforehand when the self-timer is in use. Therefore, this light emitting diode is built into the camera so that the photographer can see this luminous radiation even at a distance from the camera. Afterwards, if standard pulses are further delivered as inputs to reversible counter 8, both outputs Q10 and Q13 of counting stages 8-10, 8-13 become 1 in 9 seconds after that. Therefore, now suppose the self-timer time is set to 9 seconds. The time 9 seconds of self-timer can be measured by the Q outputs of these counting stages 8-10 and 8-13 are obtained on and AND circuit logical product basis. AND circuit 105 adopts this logic product basis and if output F1 of this AND circuit 105 is inverted from 0 to 1, the output of NOR circuit 1-4 becomes 0 and output E2 of NAND circuit 1-7 becomes 1. When E2 becomes 1, the outputs E3 of NOR circuit 1-2 then becomes 0. Since the output of NAND circuit 19-1 for self-timer display circuit 19 becomes 1 by E3 being 0 transistor 19-2 is rendered conductive, and light emitting diode 19-3 stops radiating and hence, the radiating time of light emitting diode 19-3 is only 1 second before completion of self-timer, operation by which the photographer can determine completion of the self-timer's time. When E3 becomes 0 the output of AND circuit 4-9 becomes 0, simultaneously the output of AND circuit 4-8 is changed from 0 to 1, and then the output of OR circuit 4-7 becomes 1 and the 1 signal is delivered to the input E4 of NOR circuit 4-1, whereby oscillation stops Here, the reason why the output of AND circuit 4-8 is changed from 0 to 1 after changing of E3 from 1 to 0 is explained. The output E6 of inverter 12-6 for gate control circuit 12 and an inversion signal of E6 through inverter 4-18 are inputs to the AND circuits 4-16, 4-17 of standard pulse generating circuit 4 and an output of switching circuit 20-1 whose output level is inverted from 0 to 1 after elapse of a given time after opening of timing switch SW3 is applied as a 1 signal input through inverter 20-2 to the other input of AND circuit 4-17. (The timing switch is still being closed as will be explained later) Since the input at one side of it is 0, however, the output is 0. The output of inverter 1-13 is the other input to AND circuit 4-16 to which the 1 signal of E6 is applied directly as an input, and because the monostable multivibrator constituting NOR circuit 1-10, inverter 1-11 and so forth is triggered by an inversion of E3 signal level from 1 to 0 it is also triggered, allowing the output of inverter 1-11 to be 1 at the same time. This 1 signal input is delivered to AND circuit 4-16 through NOR circuit 1-12 and inverter 1-13. As a result, the output of AND circuit 4-16 becomes 1, and is applied through OR circuit 4-15 to AND circuit 4-13. A 0 signal of control line 2-1 is then delivered as an input through inverter 4-19 to the other input of AND circuit 4-13. Consequently the output of AND circuit 4-13 becomes 1 and is an input to AND circuit 4-8 by way of OR circuit 4-11. Therefore, the output of AND circuit 4-8 is changed from 0 to 1. An inversion of E3 from 1 to 0 also acts upon the NOR circuit 10-1, of memory call-up transfer circuit 10, the NOR circuit 18-1 of shutter control circuit 18, NOR circuit 104, the NOR circuits 5-1, 5-13 of brightness time conversion circuit 5 and NOR circuit 106. In explanation, if E3 is an input to the NOR circuit 10-1 of memory call-up transfer gate circuit 10 and becomes 0, the output E8 becomes 1 because a 0 signal is given as an input to the other input of it. Since one input of NOR circuit 18-1 for shutter control circuit 18 is subjected to a 0 signal input as described later, the output E5 is then changed to 1 in synchronism with an inversion of E3, and this 1 signal is an input to NOR circuit 104 to make the output F2 0, and simultaneously, it applies "O" to the base of transistor 18-3 through inverter 18-2, thereby rendering transistor 18-3 conductive and magnetizing electromagnet M1. A travelling of back curtain is held by both a hold lever and electromagnet M1. As NOR circuit 106 has a 0 signal input of control line 2-1 at one input and also a 0 signal input of E3 at the other input, the output E9 becomes 1. Another input of NOR circuit 5-13 of brightness time conversion circuit 5 receives a 1 input as will be explained later, and therefore the output is maintained at 0 even if E3 is inverted from 1 to 0. The E3 input of the NOR circuit 5-1 of brightness time conversion circuit 5 is inverted to 0, and at the same time, a 1 signal input is delivered to the other input of it through NOR circuit 1-12 and inverter 1-13 because the output of inverter 1-11 of monostable multivibrator made of NOR circuit 1-10, inverter 1-11, etc. as mentioned above is 1, by which the output of NOR circuit 5-1 is maintained at 0. The output of monostable multivibrator consisting of NOR circuit 1-10, inverter 1-11, etc. which is triggered by an inversion of E3 from 1 to 0 becomes 1 as mentioned above, and makes the output R1 of NOR circuit 1-12 0 thereby resetting reversible counter 8 again and inverting the output of inverter 1-13 to 1. Accordingly, the output R2 of OR circuit 101 becomes 1 and resets frequency dividing circuit 7 again. Then, with the monostable multivibrator composed of NOR circuit 1-10, inverter 1-11 and so forth having been stabilized, it becomes 1 through NOR circuit 1-12 when the output of inverter 1-11 returns to 0 as at a previous state, releases reset of reversible counter 8 and makes R2 0 through inverter 1-13 and OR circuit 101, thus releasing frequency dividing circuit 7 from being reset. Since the output pof inverter 1-13 becomes 0, and since this 0 signal then makes the output E4 OR circuit 4-7 O after passing AND circuit 4-16, OR circuit 4-15, AND circuit 4-13, OR circuit 4-11, AND circuit 4-8 in turn, thus allowing standard pulses to start generating again. Simultaneous with generation of these standard pulses, 0 signal of inverter 1-13 is delivered to one input of NOR circuit 5-1 for brightness time conversion circuit 5. Accordingly, the output of NOR circuit 5-1 becomes 1, both transistors 5-2, 5-3 are rendered nonconductive and charging to condenser 5-5 starts through photoconductive cell 5-4.

Photoconductive cell 5-4 referred to herein is arranged, in the internal photometric type single lens reflex camera and consisting of elements whose resistance values are varied corresponding to the brightness of a subject such as CdS, at a position where it recieves the light which passes through a photographing lens and is reflected by mirror. To the junction point between photoconductive cell 5-4 and condenser 5-5 is connected the input of switching circuit 506 as shown, the output of which is connected to one input terminal end of NOR circuit 5-8, and normally the output signal of switching circuit 5-6 is maintained at 0. The output 0 is an input to NOR circuit 5-8, one end of which is being at the input state with an output 1 signal of inverter 20-2 for delay circuit 20 and through inverter 5-7, thus the output is made 1. This 1 signal is then delivered as an input to AND circuit 5-9 and a 0 signal of control line 201 is an input through inverter 5-10 to the other input of the AND circuit 5-9, whereby the output of AND circuit 5-9 is made 1, and which is in turn delivered to NOR circuit 5-13, making output E7 0. As described above, standard pulses produced in the standard pulse generating circuit 14 concurrently with the start of charging of condenser 5-5 are delivered as inputs through NOR circuit 6 to the AND circuit 10-2 of Memory call-up transfer gate circuit 10, in which case, the output E8 of NOR circuit 10-1 is then 1 as mentioned above. Hence, AND circuit 10-2 is given a 1 signal to permit input signals to pass, which is intercepted by AND circuit 10-4 being provided with 0 signal. Standard pulses applied to AND circuit 10-2 are delivered as inputs through AND circuit 10-2 and OR circuit 10-5 to the NAND circuit 9-21 of signal passage transfer circuit 9 and frequency dividing circuit 7.

Here, an explanation is given regarding the signal passage transfer circuit 9. Although partially omitted in the drawings it is provided with control terminals made up of 9-1, 9-2 — 9-16, 9-17. As explained later, one control terminal is earthed according to film sensitivity, diaphragm information, etc. and the signal level is made 0. This control terminal is connected to the gate of a switch element or one input terminal of a NOR circuit, and if it becomes 0, the switching element will be rendered conductive or signals being delivered as inputs to other input terminal of NOR circuit are permitted to pass. Accordingly if control terminal 9-2 is selected to be 0 (earthed) for example, standard pulses pass OR circuit 10-5 and pass the NAND circuit 9-21, the other input of which receives the 1 signal input of E8. These signals are inputs to the gate 8-3', which is connected between the counting stages 8-3 and 8-4 of reversible counter 8, after passing the NOR circuit 9-22 under control of control terminal 9-2. And, if control terminal 9-5 is selected and set to 0, switching element 9-23 will be rendered conductive, and the 0 signal is then applied to the AND circuit 11-3 of memory call-up transfer gate circuit 11 and delivered through auto manual transfer gate circuit 13 to reversible counter 8. If control terminal 9-13 is selected to be 0, switching element 9-24 will be rendered conductive and standard pulses, after being divided through the frequency dividing stage 7-1, 7-2 — 7-8 of frequency dividing circuit 7, are applied through switching element 9-24 to the AND circuit 11-3 of memory call-up transfer gate circuit 11, and further applied through auto manual transfer gate circuit 13 and delivered to reversible counter 8. (Here, 1 is an input to one input terminal of AND circuit 11-3 for memory call-up transfer gate circuit 11 because E6 is 1 as mentioned above, and therefore, signals delivered to the other input are allowed to pass the AND circuit 11-3 and OR circuit 11-5, and one input of AND circuit 13-2 for auto manual transfer gate circuit 13 is also receptive of an input of a 1 signal from E9 as mentioned above Consequently, signals connected to the other input can pass AND circuit 13-2, OR circuit 13-4). Standard pulses thus applied as inputs to reversible counted 8 are added and counter therein.

As described above, condenser 5-5 of brightness time conversion circuit 5 proceeds to be charged and after an elapse of time which corresponds to the brightness of a subject, the condenser 5-5 reaches a certain required level of charging voltage, and then the output of switching circuit 5-6 is inverted from 0 to 1. The time taken here from the start of charging of condenser 5-5 to the invention of the output of switching circuit 5-6 from 0 to 1 depends upon the resistance value of photoconductive cell 5-4 and the capacitance of condenser 5-5. This time is in inverse proportion to the brightness of a subject, namely, if the brightness of a subject is high it is short and when the brightness of a subject is low it is long. Now the output of switching circuit 5-6 having been inverted from 0 to 1 and maintained, this 1 signal is an input to NOR circuit 5-8, thus making the output of NOR circuit 5-8 0. Then the 0 signal is applied to NOR circuit 5-13 through AND circuit 5-9, OR circuit 5-12 to allow the output E7 to be inverted from 0 to 1, whereby NOR circuit 6 is disabled and passing of standard pulses is stopped. Accordingly, the number of pulses which corresponds to the brightness of a subject is counted and memorized in reversible counter 8. That is, if film sensitivity and diaphragm openings are equal, the number of pulses memorized in the reversible counter 8 is few where the brightness of a subject is high and many where it is low. The memory value memorized in the reversible counter 8 is displayed, for example, as shutter speed in the finder, by the display circuit for shutter speeds, as will be explained in detail in conjunction with FIG. 4. And, by the output E7 of NOR circuit 5-13 having been inverted from 0 to 1, the monostable multivibrator made up of NOR circuit 103, inverter 102, etc. is triggered, which maintains the output of inverter 102 at 1 for a given time and resets frequency dividing circuit 7 via OR circuit 101. Then, if E7 is inverted from 0 to 1, the diode 12-1 of gate control circuit 12 is intercepted, charging condenser 12-4 is started, and after elapse of a given time, the output of switching circuit 12-5 is inverted from 0 to 1, by which the output of NOR circuit 10-1 for memory call-up transfer gate circuit 10 becomes 0, intercepts AND circuit 1-2 and enables AND circuit 10-4 to be ready for passing signals. Moreover, an inversion of the output of switching circuit 12-5 also causes the output E6 of inverter 12-6 to be inverted from 1 to 0. And, an inversion of the output of switching circuit 12-5 from 0 to 1 triggers the monostable multivibrator consisting of NOR circuit 15-6, inverter 15-7, etc., which is then applied through inverter 15-8 to NOR circuit 15-9, the output t being 1 for a given time. This 1 signal is delivered as an input direct and through inverter 111 to reversible counter 8. Meanwhile, diode 15-1 is intercepted by an inversion of output of switching circuit 12-5 from 0 to 1, and after an elapse of a given time after the start of charging of condenser 15-2 the output of, switching circuit 15-4 is inverted from 0 to 1. This 1 signal is given as an input to NAND circuit 107. One input of this NAND circuit 107 is being subject to an input 0 signal from control line 2-1 through inverter 110, however, the output T of NAND circuit 107 is then inverted from 1 to 0 and T is inverted from 0 to 1, thereby allowing reversible counter 8 to be ready for controlling subtraction. An inversion of these T, $\overline{T}$ signals referred to herein is made during a period of time in which the output of inverter 15-7 of monostable multivibrator comprosed of NOR circuit 15-6, inverter 15-7, etc. as mentioned above is 1, that is, during a period of time in which the output t of NOR circuit 15-9 is 1. This is intended to prevent the memory valves memorized in reversible counter 8 from being changed when the reversible counter 8 is shifted from the state of controlling addition to that capable of controlling subtraction.

The internal structure of reversible counter 8 and action of control signals are omitted here because they are stated in detail in the patent application No. Sho 48-95007.

An inversion of E6 from 1 to 0 cuts off the AND circuit 4-16 of standard pulse generating circuit 4 and applies 1 as an input to AND circuit 4-17 thus making the output 1, and through OR circuit 4-15, AND circuit 4-13, etc., it makes the output of OR circuit 4-7 and also the input end E4 of NOR circuit 4-1 be 1, thereby stopping generation of standard pulses again. Moreover, a signal of E6 delivers a 0 signal to one input and AND circuit 11-3 for memory call-up transfer gate circuit 11, by which this AND circuit 11-3 is intercepted giving a 1 signal to one input of AND circuit 11-2, and thereby signals delivered to the other inputs are allowed to pass. Since E6 is then an input to the NAND circuit 1-6 of self-timer control circuit 1, its inversion from 1 to 0 makes the output 1 and consequently, transistor 1-14 will be rendered conductive and electromagnet M2 is demagnetized. Followed by demagnetization of the electromagnet M2 the mirror-locking pawl so far being locked releases locking with mirror-driving member by means of a spring (not shown). Therefore, the mirror driving member is rotated to allow the mirror to rise. Exposure begins when the front shutter curtain (not shown) is caused to start travelling by a well-known method, i.e., by releasing the front curtain locking pawl (not shown) which locks the front curtain when the mirror starts rising and at a position where it went up to the top. Simultaneously, the holding lever then checking travel of the back curtain as mentioned above is released; the back curtain will never travel because electromagnet M1 is being magnetized. Almost at the same time as when the front curtain started travelling, timing switch SW3 is opened by a front curtain travelling member (not shown). Meanwhile, mirror-up action cuts off the light falling on photoconductive cell 5-4. Since the output of switching circuit 5-6 maintains a 1 signal, however, no effects will be exerted on the circuits. After opening of timing switch SW3, a charging of the condenser 20-4 of delay circuit 20 starts through resistor 20-3, and after elapse of a given time, the output of switching circuit 20-1 is inverted from 0 to 1. This delay circuit is, as stated in detail in the patent application No. Sho 48-95006, for use in synchronizing the time at which exposure actually begins after the front curtain starts opening and the time at which to call up the memory values memorized. An inversion of the output of switching circuit 20-1 from 0 to 1 resets the display circuit for shutter speeds through inverter 20-2. A 0 signal being given to AND circuit 4-17, and further through OR circuit 4-15, AND circuit 4-13, etc., and the output of OR circuit 4-7 is then made 0, and the input E4 of NOR circuit 4-1 is provided with 0, thereby allowing the third generation of pulses to start.

Nor circuit 6 is then intercepted because E7 is 1 and standard pulses produced are delivered as inputs through AND circuit 10-4, OR circuit 10-5 to frequency dividing circuit 7. At this time, NAND circuit 9-21 is intercepted and AND circuit 11-3 of memory call-up transfer gate circuit 11 is also cut off and AND circuit 13-3 of auto manual transfer gate circuit 13 is intercepted as well. Consequently, the routes through which signals can pass are only those for AND circuit 11-2, OR circuit 11-5 of memory call-up tranfer gate circuit 11 and AND circuit 13-2, and OR circuit 13-4 of auto manual transfer gate circuit 13. As a result, standard pulses delivered as inputs to frequency dividing circuit 7 are divided at eight stages in frequency dividing circuit 7, and after the frequency is set to 8 KHz, are given to reversible counter 8 whereby subtraction starts. Use of a lower frequency than when memorizing in case of calling or reading-out memory values is to shorten the time requied for memory as mentioned under the application No. Sho 48-95007. Next, an explanation is made about the detection circuits. Automatic setting functions to detect a shutter closing signal by means of the first detection circuit 16. For the second detection circuit 17, the detection circuit employed in manual setting, an explanation is to be made later. The first detection circuit 16 is composed of switching elements 16-1, 16-2, 16-3 — 16-16 16-17, 16-18, whose gate terminals are connected to the $\overline{Q}$ outputs of respective counting stages 8-1, 8-2, 8-3 — 8-16, 8-17, 8-18 in the reversible counter 8 and AND circuit 16-21. If the number of pulses being applied to reversible counter 8 are memorized there, at least one of $\overline{Q}1, \overline{Q}2, \overline{Q}3, - \overline{Q}16, \overline{Q}17, \overline{Q}18$ become 0, and the gate of the switching element of the first detection circuit 16 corresponding thereto becomes 0 thereby being conductive. Then the signal level of automatic detection line 16-20 also becomes 0, which is delivered as an input to AND circuit 16-21. Since the T signal is being given to the other input of AND circuit 16-21 moreover, the output of AND circuit 16-21 becomes 0 at the time of memory. This 0 signal is delivered as an input to the AND circuit 14-1 of auto manual transfer gate circuit 14, its output being 0, which then makes the output of OR circuit 14-4 0 and is given as an input to the NOR circuit 18-1 of shutter control circuit 18. (At this time, the 0 signal of control line 2-1 is applied at one input of AND circuit 14-3 and a 1 signal is applied to the other input side of AND circuit 14-1 through inverter 14-2) Standard pulses divided and applied as inputs to reversible counter 8 call up the memory values so far memorized in the reversible counter 8, and when the memory value becomes zero all the outputs $\overline{Q}1, \overline{Q}2, \overline{Q}3, - \overline{Q}16, \overline{Q}17, \overline{Q}18$ of respective counting stages become 1, and therefore, all switching elements 16-1, 16-2, 16-3 — 16-16, 16-17, 16-18 corresponding to them are intercepted. Consequently the signal level of automatic detection line 16-20 becomes 1, As $\overline{T}$ is 1 at this time the output of AND circuit 14-1 is 1, the output of AND circuit 14-1 is 1, the output of OR circuit 14-4 is 1 and the output E5 of NOR circuit 18-1 becomes 0, and as a result a 1 signal is given through inverter 18-2 to the base of transistor 18-3. As a result transistor 18-3 is intercepted and electromagnet M1 is then demagnetized, while the output F3 of NOR circuit 104 becomes 1 as both E5 and E3 become 0, and the input end F2 of NOR circuit 4-1 for standard pulse generating circuit 4 becomes 1 thus stopping generation of pulses. A demagnetization of electromagnet M1 accelerates the back curtain to travel, completing exposure. As the lock lever having so far locked the release plate is released from being engaged with the said release plate by the travelling back curtain, the release plate returns to its previous position again. Here, an explanation is made of particulars that have not been mentioned above.

The last counting stage 8-18 of reversible counter 8, even after Q 18 became 1 by an output of its preceding stage at the time of memory, has a function to maintain the state as it was regardless of input pulses applied afterwards. (The circuitry of this counting circuit was explained in detail in the patent application No. 48-95008). The output $\overline{Q}18$ of this counting stage 8-18 is an input to the NAND circuit 1-6 of the self-timer control circuit 1, which is intended for the purposes discussed below. For example, if camera release is made when the brightness of a subject is very low or when the self-timer lever is set to its timer position with a lens cap attached on the photographing lens, the amount of light falling upon the photoconductive cell 5-4 is very small, and consequently, the memory time after completion of self-timer time becomes very long by which the output of switching circuit 5-6 for brightness time conversion circuit 5 is maintained. According to the present invention, as mentioned in the preceding paragraph, the electromagnet for controlling the self-timer is substantially demagnetized by a signal whereby the output of switching circuit 5-6 is inverted from 0 to 1 so that the mirror is made rise, allowing exposure to start. There is, however, a situation which may arise such that the output of switching circuit 5-6 being kept to maintain 0 will fail to demagnetize the electromagnet M2, without ever starting exposure. To eliminate this defect, in this embodiment when a $\overline{Q}18$ signal of last counting stage 8-18 becomes 0, the 0 signal is an input to NAND circuit 1-6 forcing electromagnet M2 to be demagnetized, whereby the front curtain starts travelling and timing switch SW3 is opened at the same time. Even when the output of switching circuit 5-6 for brightness time conversion circuit 5 is still 0, the output of inverter 20-2 for delay circuit 20 operating on timing switch SW3 is applied as input to NOR circuit 5-8 through inverter 5-7. Through an inversion of output of this delay circuit 20, signals equivalent to the inversion of the output of switching circuit 5-6 are applied to NOR circuit 5-8, thus actuating gate control circuit 12 and reversible counter control circuit 15, etc. and as a result, an inappropriate actuation of the system can be prevented.

Next, an explanation is given in regard to the R-S flip-flop circuit composed of NAND circuits 1-7, 1-8 in the self-timer control circuit 1. As described above, since E1 is given a 1 signal concurrent with a supply of power, a 0 signal is then delivered to one input end of NAND circuit 1-8, the output of which becomes 1. And, an output 1 signal of NOR circuit 1-4 (F1 is 0 and another input is also 0 by means of SW4) is connected to the input of NAND circuit 1-7 which is also 1. Therefore, the output of E2 of NAND circuit 1-7 becomes 0 and this E2 signal is applied as input to NAND circuit 1-8, and hence, even if E1 becomes 0 after an elapse of a given time, the output E2 of NAND circuit 1-7 is maintained 0. Then, when the output of AND circuit 105 becomes 1 after completion of the self-timer time, the output of NOR circuit 1-4 becomes 0, by which the output E2 is fed back to the input of NAND circuit 1-8, the output of NAND circuit 1-8 is also inverted from 1 to 0. After completion of the self-timer time, reversible counter 8 is then reset making the output of AND circuit 105 a 1 signal which is delivered as an input from the output of NOR circuit 1-4 to NAND circuit 1-7. The other input receives a 0 output signal of NAND circuit 1-8, and therefore, the output E2 of NAND circuit 1-7 maintains 1. In memory action, moreover, it is fully considered that both the outputs Q10 and Q13 of counting stages 8-10, 8-13 for reversible counter 8 become 1. After another signal of NAND circuit 1-8 is once inverted from 0 to 1, the state remains unchaged throughout and hence, the output E2 maintains 1 without changing E3 even if another input of NAND circuit 1-7 is changed, achieving normal actuation for the system.

Next, an explanation is made of the manual setting using the self-timer. Similarly as in automatic setting, the self-timer lever is set to self-timer position prior to photographing. The movable contact piece 9-20M (described in conjunction with FIG. 3) to be moved by the auto manual photographing transfer ring is moved to the manual photographing position, i.e. to a position where it is grounded to one of the terminals 9-1M, 9-2M, — 9-17M except control terminal 2-2. In this case, the movable contact piece 9-20A connected to the diaphragm ring and film sensitivity setting ring can be set at any position. If power switch SW1 is closd by depressing the camera release, control line 201 is given a 1 signal because the control terminal 2-2 of auto manual transfer circuit 2 is opened, and since self-timer switch SW4 is being closed then, the control line 1-1 of the self-timer is given a 0 signal. And also, the output E1 of reset pulse generating circuit 3 made of the monostable multivibrator which actuates in synchronism with a supply of power becomes 0 signal after developing a 1 signal for a given time. When output E1 is 1, this 1 signal makes the output R1 0 through NOR circuit 1-12, resets reversible counter 8 and through 1-9 resets the R-S flip-flop circuit composed of NAND circuit 1-7, 1-8 by means of which the output E2 of NAND circuit 1-7, 1-8 is made 0 and the output E3 of NOR circuit 1-2 is also made 1 similarly as in the case of automatic setting mentioned aove. During a period of time in which output E1 is 1, output R1 is 0 as stated aove, whereby a 1 signal output is generated at the output R2 of OR circuit 101 to which E1 is applied as input through inverter 1-13, thus resetting frequency dividing circuit 7. The output E1 is also delivered as an input to OR circuit 1-3, and since the other input of this OR circuit 1-3 is connected to the control line 1-1 of the self-timer and maintains 0, 1 signal is then given to the input terminal E4 of NOR circuit 4-1 by way of AND circuit 4-9, OR circuit 4-7. Signals from output E3 are delivered as inputs to NOR circuits 5-1, 5-13, 10-1, 104, 106, all the outputs of which become 0. Accordingly, the transistors 5-2, 5-3 of brightness time conversion circuit 5 will be rendered conductive and condenser 5-5 will not be charged, the output of switching circuit 5-6 being 0. The output E7 of NOR circuit 5-13 is applied as input to gate control circuit 12, diode 12-1 is rendered conductive condenser 12-4 is not charged and the output of switching circuit 12-5 is then 0. Therefore, the output of switching circuit 15-4 is also 0 while the output of switching circuit 15-4 is applied as input to NAND circuit 107. 1 signal of control line 2-1 is given to one side input end of NAND circuit 107 through inverter 110, and as a result, the output T becomes 1 and $\overline{T}$ becomes 0. Since control line 2-1 is not changed from being 1, reversible counter 8 is held in the state for controlling addition, regardless of output conditions of the switching circuit 15-4. As an output 0 of switching circuit 12-5 is applied as input through inverter 12-6 to NOR circuit 15-9, the output t of NOR circuit 15-9 becomes 0 and $\overline{t}$ comes to be 1, thus giving an addition control signal to reversible counter 8. The output F2 of NOR circuit 104 then being 0 is delivered as an input to NOR circuit 4-1. Since NOR circuit 106 receives a 1 signal of control line 2-1 together with a 1 signal of E3, its output becomes 0, which is not changed in case of manual setting. The 1 signal of E3 is also applied as input to NOR circuit 18-1 and its output E5 becomes 0, which is in turn applied through inverter 18-2 to the base of transistor 18-3, whereby transistor 18-3 becomes nonconductive and electromagnet M1 is not magnetized. Since reversible counter 8 is reset while output E1 is 1, moreover the output of AND circuit 105 is then 0 and the output of NOR circuit 1-4 of self-timer control circuit 1 is 1. NAND circuit 1-6 has 1 signal as input, which is applied to the base of transistor 1-14 with its output inverted to 0, thereby rendering the transistor 1-14 conductive and magnetizing electromagnet M2. Then, the monostable multivibrator of reset pulse generating circuit 3 is restored to make E1 0.

This 0 signal is applied as input to NOR circuit 1-12, makes it output R1 1 and releases reversible counter 8 from being reset. And also, the 1 signal of R1 is applied as input through inverter 1-13 to OR circuit 101 to make its output R2 0, and releases frequency dividing circuit 7 from being reset. Concurrent with resetting of these reversible counter 8 and frequency dividing circuit 7, the output of OR circuit 1-3 becomes 0, and therefore, the outputs of AND circuit 4-9, OR circuit 4-7 also become 0 and then the both the inputs E4 and F2 of NOR circuit 4-1 become 0. Thus, standard pulses start generating from the standard pulse generating circuit consisting of NOR circuit 4-1, inverter 4-2 and so forth. Standard pulses produced as the result of outputs given by inverter 4-3 pass the AND circuit 10-4 and OR circuit 10-5 of memory call-up transfer gate circuit 10 similarly as in the case of automatic setting and are applied as inputs to frequency dividing circuit 7. NOR circuit 6 then receives a 1 signal input control line 2-1 and is intercepted. Standard pulses delivered to frequency dividing circuit 7 pass the AND circuit 13-3, OR circuit 13-4 of auto manual transfer gate circuit 13 connected to the last frequency dividing stage 7-12 after being divided through respective dividing stages and are divided more by reversible counter 8. As will be mentioned later, the switching element of the second detection circuit 17, that is, one of the elements, 17-1, 17-2, 17-3 and so forth will be rendered conductive by means of a control terminal selected according to a set value as set by manual means of operation. Standard pulses divided are sent to manual detection line 17-20, which are applied as inputs to AND circuit 14-3 one input of which is connected to control line 2-1 and delivered as inputs through OR circuits 14-4 to NOR circuit 18-1. The output E5 is then maintained as 0 without change because the 1 signal of E3 is given as an input to other input end of NOR circuit 18-1. When standard pulses are divided by frequency dividing circuit 7 and reversible counter 8 allowing both the outputs Q10 and Q13 of counting stages 8-10, 8-13 for reversible counter 8 to be 1, or 9 seconds after start of oscillation, the output of AND circuit 105 becomes 1. Consequently, the output of NOR circuit 1-4 for self-timer control circuit 1 becomes 0 which, similarly as in the case of automatic setting, results in making the output E2 of NAND circuit 1-7 1 and the output E3 of NOR circuit 1-2 0, during which, also similarly as in the case of automatic setting, the output of NAND circuit 19-1 where the output Q13 of counting stage 8-13 for reversible counter 8 is applied as input becomes 0 concurrently when Q13 becomes 1 eight seconds after start of oscillation. This is because the 1 signal of E3 is applied to its other side, thereby allowing transistor 19-2 to be rendered conductive and permitting light emitting diode 19-3 to be lighted. Then, simultaneous with an inversion of E3 from 1 to 0 it puts out the display to announce completion of self-timer actuation. The output of AND circuit 4-9 for standard pulse generating circuit 4 become 0 by inversion of E3, while the output of OR circuit 4-11 is connected as shown to the other input of AND circuit 4-8 and the outputs of AND circuits 4-12, 4-13 are applied to this OR circuit 4-11. In case of manual setting, a signal of control line 2-1 is applied through inverter 4-19 to AND circuit 4-13, whereby the output of this AND circuit 4-13 is made 0, and a 1 signal is applied to AND circuit 4-12 through inverter 4-14. The other input of this AND circuit 4-12 receives an output 1 from the inverter 20-2 of delay circuit 20, the output of which becomes 1. Thus 1 signal is then delivered as input via OR circuit 4-11 to AND circuit 4-8, while 1 is als applied to the other input through inverter 4-10 by an inversion of E3 from 1 to 0, and hence, the output of AND circuit 4-8 becomes a 1 signal, which is then delivered as an input signal E4 of NOR circuit 4-1 by way of OR circuit 4-7, thus allowing pulses to stop generation. When E3 is inverted from 1 to 0, just as in the case of automatic setting, manual setting time is displayed, and simultaneously, the monostable multivibrator composed of NOR circuit 1-10, inverter 1-11, etc. is triggered, maintaining the output of inverter 1-11 at 1 for a short while, whereby the output R1 of NOR circuit 1-12 becomes 0, reversible counter 8 is reset and frequency dividing circuit 7 is reset through inverter 1-13. Since E7 is also inverted at this time as will be mentioned later, the monostable multivibrator consisting of NOR circuit 103, inverter 102 and others is then triggered, the output of which is kept at 1 for a short time. The output R2 of OR circuit 101 becomes 1 in any case. An inversion of E3 also allows the output E7 of NOR circuit 5-13 for brightness time conversion circuit 5 to be 1. Because the 1 signal of control line 2-1 is applied as input to AND circuit 5-11 and the other input is grounded at 0, the outputs of AND circuits 5-9, 5-11 become 0 respectively, with the output of OR circuit 5-12 being 0. IF E7 becomes 1, condenser 12-4 of gate control circuit 12 starts being charged, and after elapse of a given time, the output of switching circuit 12-5 is inverted from 0 to 1. Through this inversion is actuated the monostable multivibrator of reversible counter control circuit 15 consisting of switching circuit 15-4, NOR circuit 15-6, inverter 15-7 and others. As mentioned above, however, this will never change the conditon under which reversible counter 8 is controlled for addition. And, the output E8 of NOR circuit 10-1 for memory call-up transfer gate circuit 10 is kept at 0 while E3 is inverted to 0 and switching circuit 12-5 is inverted to 1 it return to 0 concurrently when the output of switching circuit 12-5 becomes 1. As a result, AND circuit 10-2 is made capable of passing signals for a short time after being intercepted for the first time and intercepted again afterward. Accordingly, the signal routes are formed of AND circuit 10-4, OR circuit 10-5. Then, the output E5 of NOR circuit 18-1 for shutter control circuit 18 also becomes 1 by an inversion of E3, thereby rendering transistor 18-3 conductive and allowing electromagnet M1 to bwe magnetized. Manual detection line 17-20 is then at 0 signal level as both frequency dividing circuit 7 and reversible counter 8 are being reset and the outputs of AND circuit 14-3 and OR circuit 14-4 are 0. As for input of NOR circuit 104, moreover, the output F2 of NOR circuit 104 maintains 0 because the output E5 of NOR circuit 18-1 is inverted from 0 to 1 simultaneously with inversion of E3 from 1 to 0. The output E6 of inverter 12-6 for gate control circuit 12 is applied as input to the NAND circuit 1-6 of self-timer control circuit 1 and the output of NAND circuit 1-6 becomes a 1 when this E6 is inverted from 1 to 0, thereby intercepting transistor 1-14 and demagnetizing electromagnet M2. Following demagnetization of electromagnet M2, similarly as in the case of automatic setting, mirrorlocking pawl and mirror driving member are released from being engaged with each other. Then, the mirror rises by means of the mirror-driving member, and front curtain locking pawl is released at a position when the mirror is entirely up, starting the front curtain to travel and allowing timing switch SW3 to open at the same time. Upon opening of timing switch SW3, condenser 20-4 starts being charged, which causes the output of switching circuit 20-1 to be inverted from 0 to 1 after an elapse of a given time. By this the output of inverter 20-2 becomes 0, thereby the light emitting diode so far having displayed manual setting time is put out, and simultaneously the outputs of AND circuit 4-12, OR circuit 4-11 and others become 0 and the input E4 of NOR circuit 4-1 becomes 0, thus resuming generation of pulses again. Standard pulses produced are then delivered as inputs through the AND circuit 10-4, OR circuit 10-5 of memory call-up transfer gate circuit 10 to frequency dividing circuit 7. Standard pulses thus given as inputs are divided passing through all stages of frequency dividing circuit 7 and then delivered through the AND circuit 13-3, OR circuit 13-4 of auto manual transfer gate circuit 13 to reversible counter 8, where they are further divided. At this time, one from among the control terminal groups for signal passage transfer circuit 9 is selected, and while the control terminal is grounded at 0, the switching element whose gate terminal is connected to the control terminal is rendered conductive, sending frequency-divided standard pulses to manual detection line 17-20. The control terminal is selected according to the set value as set by manual setting means, for example, if control terminal 9-2 is selected to be 0, switching element 17-1 is then rendered conductive and standard pulses are divided through twelve stages, and therefore, if the oscillating frequency of a standard pulse is assumed to be 2.048 MHz, the time taken for inverting the frequency dividing stage 7-12 of frequency dividing circuit 7 is 1/1000 second after standard pulses start generating, and if control terminal 9-5 is selected and set at 0, switching element 17-5 is then rendered conductive and if control terminal 9-13 is selected after 1/128 second, switching element 17-13 is rendered conductive, and frequency-divided switching element 17-13 is rendered conductive, and frequency-divided standard pulses are sent out to manual detection line 17-20, 2 seconds later. In other words, the time of exposure that can be controlled is 1/1000 second if 9-2 is selected, 1/128 second if 9-5 is selected and 2 seconds by selecting 9-13. When signals are sent out to manual detection line 17-20 and the manual detection line 17-2: signal level becomes 1, the 1 signal is then applied as input to AND circuit 14-3 and the output is made 1, which is delivered through OR circuit 14-4 to NOR circuit 18-1. Consequently, the output E5 of NOR circuit 18-1 becomes 0, and is applied as input through inverter 18-2 to transistor 18-3, and as a result, transistor 18-3 is rendered nonconductive, and electromagnet M1 is demagnetized thus allowing the back curtain to start travelling and thereby complete exposure. Since the 0 signal is applied as input to NOR circuit 104 when the output E5 of NOR circuit 18-1 is inverted moreover, the output F2 then becomes 1, making the input of NOR circuit 4-1 for standard pulse generating circuit 4 stop generation of pulses.

Next, an explanation is made in regard to the case of automatic setting where the self-timer is not employed. When the self-timer is not used, self-timer switch SW4 is opened, and as mentioned above, the terminal 2-2 of auto manual transfer circuit is grounded. By depressing the camera release, power switch SW1 is made to close and self-timer control line 1-1 becomes 1, then control line 2-1 becomes 0. Accordingly, electromagnet M2 will not be excited, and simultaneously with a supply of power reset pulses are generated from reset pulse generating circuit 3 making the output R1 0 by way of NOR circuit 1-12 of self-timer control circuit 1, which thereby resets reversible counter 8 and also resets frequency dividing circuit 7 through inverter 1-13, OR circuit 101. And, as the output E3 of NOR circuit 1-2 has 1 signal input from self-timer control line 1-1 at one input, 0 is maintained if output E2 of NAND circuit 1-7 is changed. A 1 signal of E1 is applied as input to the NOR circuit 5-1 of brightness time conversion circuit 5 through NOR circuit 1-12, inverter 1-13 and the output is made 0, in response to which transistors 5-2, 5-3 are rendered conductive, and therefore the output of switching circuit 5-6 is maintained at 0. Since this 0 signal and the signal of delay circuit 20 are delivered as a 0 input signal through inverter 5-7, the output of NOR circuit 5-8 becomes 1. This 1 signal is applied as input through AND circuit 5-9, OR circuit 5-12, making the output E7 0. Accordingly, the output of switching circuit 12-5 becomes 0, the output E6 of inverter 12-6 becomes 1. Similarly, the output of switching circuit 15-4 also becomes 0, allowing the outputs T and T̄ of NAND circuit 107 to be 1 and 0 respectively. Then, the NOR circuit 10-1 of memory call-up transfer gate circuit 10 has inputs of 0 signal level from E3 and the 0 signal of switching circuit 12-5 and its output becomes 1, thus intercepting AND circuit 10-4 and forming the routes of AND circuit 10-2 and OR circuit 10-5 for signals. And, NOR circuit 106 has E3 as an input and control line 2-1 is applied as input to its other input, the output E9 being 1, thereby intercepts the AND circuit 13-3 of automatic manual transfer gate circuit 13 and forms the routes of AND circuit 13-2 and OR circuit 13-4 for signals. The output E5 of NOR circuit 18-1 for shutter control circuit 18 where E3 is applied as input has 0 at the other input, and therefore the output becomes 1 which allows transistor 18-3 to be rendered conductive and magnetizes electromagnet M1. As 1 of output E5 of NOR circuit 18-1 is applied to NOR circuit 104, the output F2 is 0, which is applied as input to the input of NOR circuit 4-1 for standard pulse generating circuit 4. And, the 1 signal of E6 is applied to one side terminal of AND circuit 4-16 of standard pulse generating circuit 4 and the 1 signal of E1 is applied through NOR circuit 1-12, inverter 1-13 to the other input end, and hence the output 1 of AND circuit 4-16 is delivered through OR circuit 4-15 to AND circuit 4-13. Since the other input of AND circuit 4-13 has the signal level of control line 2-1 as an input through inverter 4-19, the output of AND circuit 4-13 becomes 1, which is applied as 1 through OR circuit 4-11, AND circuit 4-8, OR circuit 4-7 to the input E4 of NOR circuit 4-1. Therefore, generation of standard pulses will not be performed.

Next, when the monostable multivibrator of reset pulse generating circuit 3 is restored to allow the output E1 to become 0, this 0 signal applies a 0 input signal to AND circuit 4-16 by way of NOR circuit 1-12 and inverter 1-13 which then applies a 0 signal to the input E4 of NOR circuit 4-1 through OR circuit 4-15 and others, whereby the standard pulse generating circuit composed of NOR circuit 4-1, inverter 4-2 and others starts generating pulses. At the same time, an output signal 0 of inverter 1-13 is also being given to the NOR circuit 5-1 of brightness time conversion circuit 5 and therefore, the output becomes 1, making transistors 5-2, 5-3 nonconductive and allowing condenser 5-5 to start being charged. Standard pulses generated are applied as inputs through NOR circuit 6, AND circuit 10-2 and OR circuit 10-5 to frequency dividing circuit 7 and signal passage transfer circuit 9. Similarly as in the case of automatic setting using the self-timer as mentioned above, these standard pulses are run through NAND circuit 9-21, NOR circuit 9-22 or through switching element 9-23 or through switching element 9-24 and others and are applied between counting stags according to the control terminal selected or directly to reversible counter 8 or after being divided by passing the frequency dividing stages 7-1, 7-2 — 7-12 of frequency dividing circuit 7 they are given to reversible counter 8, where they are added and memorized. And then, the condenser 5-5 of brightness time conversion transfer circuit 5 is charged and reaches its required voltage, and when the output of switching circuit 5-6 is inverted from 0 to 1, the output of NOR circuit 5-8 becomes 0, and through AND circuit 5-9, OR circuit 5-12, the output E7 of NOR circuit 5-13 becomes 1 which stops standard pulses passing NOR circuit 6 and completes memorization. The memory value memorized in reversible counter 8 is then displayed as shutter speed in the finder by means of the display circuit. Meanwhile, the condenser 12-4 of gate control circuit 12 begins to be charged by an inversion of output E7 of NOR circuit 5-13 to 1, and after elapse of a given time, the output of switching circuit 12-5 is inverted to 1 and the output E6 of inverter 12-6 becomes 0. When the output E6 is 0, the output of AND circuit 4-16 becomes 0 and the output of AND gate 4-17 becomes 1, and the AND circuit 11-3 of memory call-up transfer gate circuit 11 is then intercepted and AND circuit 11-2 is to be ready for passing pulses. And, the output of NOR circuit 10-2 becomes 0 by an inversion of the output of switching circuit 12-5 to 1, and AND circuit 10-3 is ready for passing pulses. An inversion of the output of switching circuit 12-5 triggers the monostable multivibrator consisting of NOR circuit 15-6, inverter 15-7, etc. and after t is inverted to 1 and $\overline{t}$ to 0 for a given time, $t$ is inverted to 0 and $\overline{t}$ to 1 again. Meantime, the output of switching circuit 15-4 is inverted from 0 to 1, to allow the output T of NAND circuit 107 to invert from 1 to 0 and $\overline{T}$ from 0 to 1, thereby shifting reversible counter 8 from the state of controlling addition to that of controlling substraction.

Operations up to this are made during the period in which the camera release is being depressed. Therefore, the ratio of memory time and actual time of exposure is set to more than 1 : 50. At the last stage of the depressing stroke of release action, the release plate is locked by the lock lever acting upon the mirror-locking pawl to release mirror-locking pawl from being engaged with mirror-driving member. The mirror thus released from engagement then starts rising and frees the front curtain locking pawl which is then locking the front curtain at a position where it goes up entirely, thereby allowing the front curtain to start travelling. Nearly at the same time as the start of travel by the front curtain, timing switch SW3 is opened by the front curtain travelling member. After opening of timing switch SW3, condenser 20-4 starts to be charged and the output of switching circuit 20-1 is inverted from 0 to 1 after elapse of a given time. Therefore, the output of inverter 20-2 is inverted from 1 to 0, by means of which the display circuit for shutter speeds is reset then to make the output of AND circuit 4-17 0, which makes the E4 input of NOR circuit 4-1 0 through OR circuit 4-15, AND circuit 4-13, starting generation of pulses again. Standard pulses thus produced are applied as inputs through AND circuit 10-4, OR circuit 10-5 to frequency dividing circuit 7. NAND circuit 9-21 is then intercepted with 0 input signal being applied to it. Standard pulses delivered as inputs to frequency dividing circuit 9 are divided in turn through frequency dividing stages 7-1, 7-2, — 7-8 and then applied to reversible counter 8 by way of AND circuit 11-2, OR circuit 11-5, AND circuit 13-2 and OR circuit 13-4, where they subtract prememorized memory values. Since respective outputs $\overline{Q1}, \overline{Q2}, \overline{Q3} - \overline{Q16}, \overline{Q17}, \overline{Q18}$ of reversible counter 8 become 1 when the memorized value becomes zero, all switching elements 16-1, 16-2, 16-3 — 16-16, 16-17, 16-18 are intercepted and automatic detection line 16-20 becomes 1. In the meantime, $\overline{T}$ is already 1 and the output of AND circuit 16-21 having this as an input becomes 1, and this 1 signal is then applied as input through AND circuit 14-1, OR circuit 14-4 to NOR circuit 18-1, making the output E5 0, whereby transistor 18-3 is rendered nonconductive and electromagnet M1 is demagnetized. Followed by demagnetization of the electromagnet M1 the back curtain is released from locking thus completing exposure. The 0 signal of output E5 of NOR circuit 18-1 is applied as input to NOR circuit 104 and makes the output F2 1, which is in turn delivered to NOR circuit 4-1 to stop generation of standard pulses.

Here, an explanation is given to the case in which the camera release is depressed and timing switch SW3 is opened prior to completion of memorizing the brightness of a subject when the brightness of a subject is low. Since the output of switching circuit 5-6 of brightness time conversion circuit 5 is not inverted from 0 to 1 in this case, gate control circuit 12 and reversible counter circuit 15 and others are generating control signals for memorization, as a result of which there is a very big error in the time of exposure. According to this embodiment, even where the output of switching circuit 5-6 of brightness time conversion circuit 5 is not inverted from 0 to 1, if timing switch SW3 is made to open, an output signal to be inverted from 0 to 1 for delay circuit 20 operating upon timing switch SW3 is applied as input to NOR circuit 5-8 through inverters 20-2 and 5-7, and a signal equivalent to inversion of the output of switching circuit 5-6 is applied as output to NOR circuit 5-8, whereby gate control circuit 12 and reversible counter control circuit 15 are actuated so as to prevent a big error in the time of exposure.

Finally, an explanation is made about the manual setting mode in which the self-timer is not employed. Since the self-timer is not used, self-timer control line 1-1 signal level becomes 1, control line 2-1 signal level becomes 1 and the output of NAND circuit 1-6 becomes 1, and therefore transistor 1-14 is intercepted and electromagnet M2 is not magnetized. NOR circuit 6 has the 1 signal of control line 2-1 applied as an input, by which it is intercepted. Selftime control line 1-1 signal level is delivered as an input to NOR circuit 1-2, making the output E3 0. Therefore, NOR circuit 5-13, where E3 is applied as input, has 0 input at the other input and consequently the output E7 is 1. And control line 2-1 is connected to NOR circuit 106, the output E9 of which is 0, which thereby intercepts the AND circuit 13-2 of auto manual transfer gate circuit 13 and allows AND circuit 13-3 to be capable of passing pulses. Reset pulses are generated by reset pulse generating circuit 3, concurrently with closing of power switch SW1 after depressing of the camera release, and reset reversible counter through NOR circuit 1-12 and reset frequency dividing circuit 7 through inverter 1-13 and OR circuit 101. Since the output E7 of NOR circuit 5-13 for brightness time conversion circuit 5 is then 1 as stated above, the output of switching circuit 12-5 for gate control circuit 12 is inverted to 1 within a short time after closing of power switch SW1, by which the monostable multivibrator and reversible counter control circuit 15 and switching circuit 15-4 are, triggered. But because T, $\overline{T}$ are respectively 1 and 0 without being changed, reversible counter 8 is held in the state for controlling addition. By depressing the camera release more, exposure is started at the same time as timing switch SW3 is opened, and after elapse of a given time, the output of inverter 20-2 becomes 0. The output of switching circuit 20-1 for delay circuit 20 then is inverted to 1, and the output of inverter 20-2 becomes 0, which is applied as input to the input E5 of NOR circuit 4-1, thus starting generation of standard pulses through AND circuit 4-17 and OR circuit 4-15. Standard pulses generated are delivered as inputs to frequency dividing circuit 7 through AND circuit 10-4, OR circuit 10-5 and after being divided by passing all dividing stages, they are given to reversible counter 8 through the AND circuit 13-3 and OR circuit 13-4 of auto manual transfer gate circuit 13 by means of which they are further divided. All other pulse routes are then closed. As described above, if the control terminal of signal passage transfer circuit 9 is selected depending upon a set value as set by manual setting, for example, if the value as set by manual setting means is 1/1000 second, standard pulses produced are divided through frequency dividing stages 7-1, 7-2 — 7-11, 7-12 of frequency dividing circuit 7, whereby manual detection line 17-20 signal level is made 1 after 1/1000 second through the switching element 17-1 being rendered conductive. This 1 signal is then applied as input through AND circuit 14-3, OR circuit 14-4 to NOR circuit 18-1, allowing the output to be 0. By this, the 1 signal is given to the base of transistor 18-3 by way of inverter 18-2, intercepting transistor 18-3 and demagnetizing electromagnet M1, this exposure is completed as set forth above. Moreover, the 0 signal of NOR circuit 18-1 is also applied as input to NOR circuit 104, and as a result, the output F2 becomes 1, and the input of NOR circuit 4-1 becomes 1, and stops generation of standard pulses.

FIG. 3 shows change-over switch SW2 for use in selecting the control terminals 9-1, 9-2, — 9-16, 9-17 of signal passage transfer circuit 9. The change-over switch SW2-A is a switch for introducing determinant factors other than the brightness of a subject in case of automatic setting, and change-over switch SW2-M is a switch for determining the time of exposure in case of manual setting. An explanation is given of this change-over switch SW2 in conjunction with FIG. 2. The change-over switch SW2-A is composed of common contact piece 9-30A, movable contact piece 9-20A and terminals 9-1A, 9-2A, — 9-16A, 9-17A. As already mentioned in conjunction with FIG. 2, movable contact piece 9-20A is moved by the coupling member connected to both the diaphragm ring and film sensitivity setting ring fitted on the camera. The change-over switch SW2-M consists of common contact piece 9-30M grounded, movable contact piece 9-20M and terminals 9-1M, 9-2M, — 9-16M, 9-17M, and as shown, the terminals 9-1A and 9-1M, 9-2A and 9-2M — 9-17A and 9-17M are short-circuited. Also, control terminals 9-1, 9-2, —9-17 of signal passage transfer circuit 9 as shown in FIG. 2 are connected respectively to 9-1A, 9-2A —and 9-17A. The change-over switch SW2-M is also provided with terminal 2-2 and as explained in FIG. 2 it moves the movable contact piece 9-20M to the terminal 2-2 by auto manual photographing transfer ring in case of automatic setting of exposure time. If movable contact piece 9-20M is short-circuited to terminal 2-2 and common contact piece 9-30M, control line 2-1 receives a 0 signal and P channel field transistor 2-4 (referred to as FET hereunder) will be rendered conductive thus allowing the common contact piece 9-30A of change-over switch SW2-A to be 0. Accordingly, the terminal short-circuited to common contact piece 9-30A by the movable contact piece 9-20A of change-over switch SW2-A becomes 0 and the control terminal coresponding to it becomes 0. Since the control line 2-1 is 0 in this case, respective circuits are actuated for automatic setting. Therefore, by properly changing the movable contact piece 9-20A of change-over switch SW2-A, other determinant factors for the time of exposure, such as film sensitivity, diaphragm information, and other factors in a multiple system, can be introduced. Now, assume that themovable contact piece 9-20A of SW2-A is moved to terminal 9-5A and this is determined as the position of ASA 100, F11, and that the number of pulses to pass NOR circuit 6 and also switching element 9-23 during the pulse width obtainable by brightness time conversion circuit 5 was eight. Then eight pulses would be applied as inputs to reversible counter eight and the output Q4 of counting stage 8-4 would be inverted. Moreover, if terminal 9-4A and common contact piece 9-30A are short-circuited by movable contact piece 9-20A where setting is made to ASA 100, F16, 8 standard pulses generated from standard pulse generating circuit 4 are delivered as inputs through NAND circuit 9-21, NOR circuit 9-25 to the gate 8-1 between the counting stages 8-1 and 8-2 of reversible counter 8. Then, as counting stage 8-5 is inverted, reversible counter 8 would substantially have inputs equivalent to 16 pulses. And, if terminal 9-30A is short-circuited by movable contact piece 9-20A and control terminal 9-6 becomes 0, assuming that setting is made to ASA 200, F11, eight standard pulses produced from standard pulse generating circuit 4 would pass switching element 9-26 after being divided by the dividing stage 7-1 of frequency dividing circuit 7 and would be given as inputs to reversible counter 8 by way of memory call-up transfer gate circuit 11 and auto manual transfer gate circuit 13. The counting stage 8-3 is then inverted and 4 pulses are memorized. If the memory value thus memorized is subtracted by the standard pulses with a definite frequency, the time of exposure in which terminals 9-4A, 9-3A, 9-2A — are short-circuited to 0 will be 2, 4, 8, — times by transfer of change-over switch SW2-A in spite of the same brightness of a subject, provided that the time of exposure when terminal 9-5A is selected is unity. And, the time of exposure in case terminals 9-6A, 9-7A — are short-circuited to 0 will be a 1/2,1/4—, thus film sensitivity and diaphragm information as taken in a multiple system can be introduced. Next, if the movable contact piece 9-20M of change-over switch Sw2-M is changed from terminal 2-2 to any other terminal, control line 2-1 becomes 1 and FET 2-4 is cut off, controlling respective circuits so as to be in the state of manual setting, and simultaneously, common contact piece 9-30A becomes 1. Now, assume the terminal 9-2M of change-over switch SW2-M is set to 0 by movable contact piece 9-20. Then standard pulses generated from standard pulse generating circuit 4 are divided in turn through the dividing stages 7-1, 7-2 — 7-11 of frequency dividing circuit 7 as mentioned above, allowing frequency dividing stage 7-12 to be inverted, and which are then sent to manual detection line 17-20 by way of the switching element 17-1 of the second detection circuit 17, thus and the time of exposure is controlled.

An explanation is also made using in conjunction with FIG. 2 of the case in which the movable contact piece 9-20M of change-over switch SW2-M is short-circuited to terminal 9-40M and common contact piece 9-30M. Terminal 9-40M is put at the bulb photographing position, for example, it is arranged so that the lock lever for the locking release plate as mentioned in FIG. 2 will not be actuated when movable contact piece 9-20M is transferred to the position of terminal 9-40M. As shown in FIG. 3 terminal 9-40M is not connected to any control terminal, and all control terminals 9-1, 9-2, 9-3 — 9-17 are rendered nonconductive. And as manual detection line 17-20 is maintained at 0 by resistor 112, the output E5 of NOR circuit 18-1 of shutter control circuit 18 will not become 0 in case of manual setting as mentioned above as long as power switch SW1 is closed. Therefore electromagnet M1 is held at a magnetizing state. If power switch SW1 is made to open, then electromagnet M1 demagnetized thereby completing exposure. Only if movable contact piece 9-20M is thus set to terminal 9-40M can bulb operation be achieved.

Figure 4:
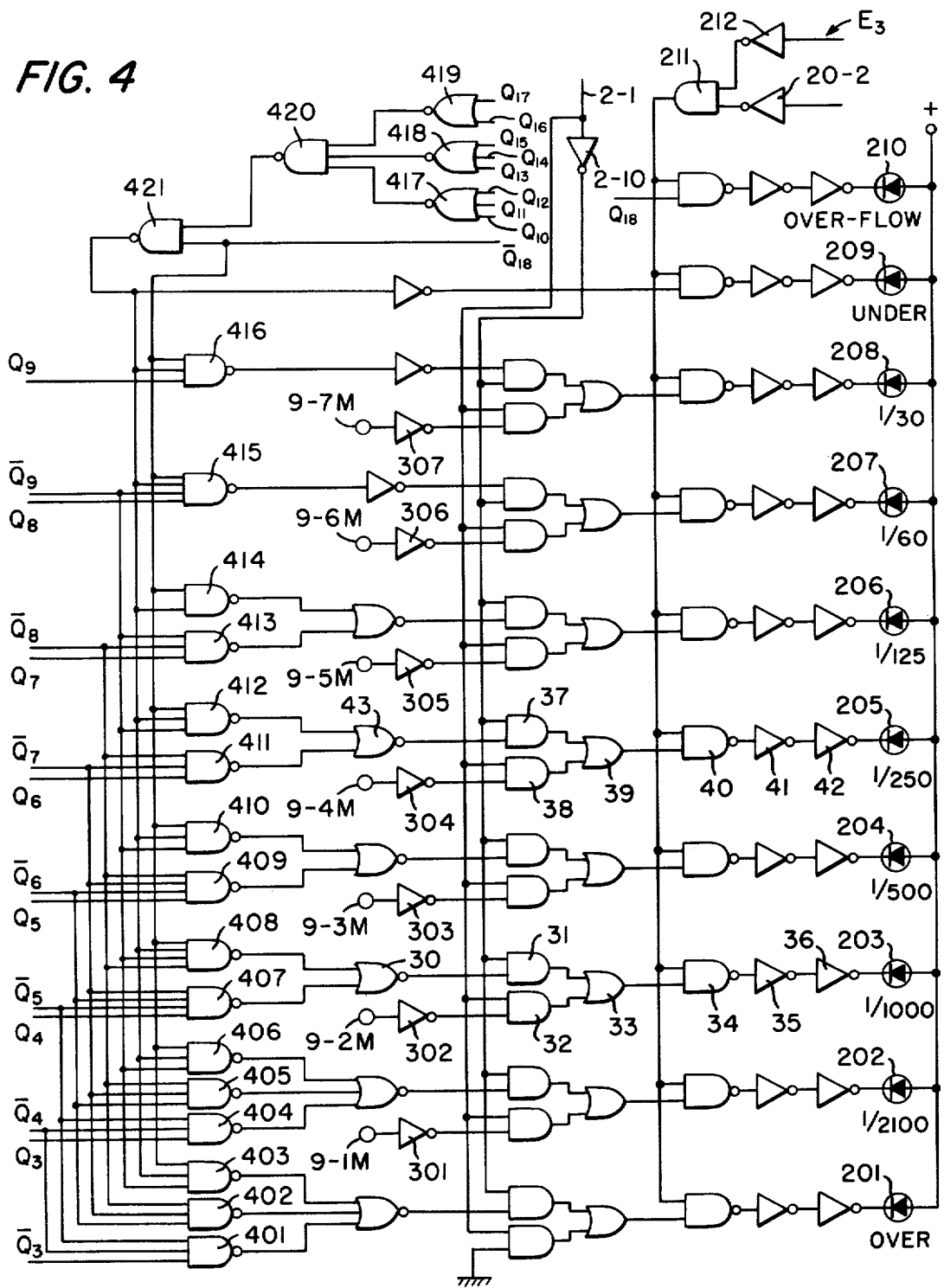
FIG. 4 shows the display circuit in the said embodiment.

FIG. 4 is an embodiment of display circuit 21 for shutter speeds. An explanation is made using FIG. 2 together with FIG. 4. The outputs of respective counting stages for reversible counter 8, Q3, $\overline{Q}$3, Q4, $\overline{Q}$4 — Q18, $\overline{Q}$18 are connected to NAND circuits 401, 402, — 416 and NOR circuits 417, 418, 419 as shown. Light emitting diodes 201, 202 — 210 are located, e.g. in the finder and display shutter speeds or a variety of exposure limit warmings (overexposure warning, hand-vibration warning, exposure limits, etc.) to the photographer according to the memory values memorized in reversible counter 8. These are actuated by output signals of inverter 20-2 of delay circuit 20 operating on the memory values memorized in reversible counter 8, control line 2-1 of auto manual transfer circuit 2, the output E3 of NOR circuit 1-2 for self-timer control 1 and timing switch SW3. (For convenience's sake, explanation hereunder will be referred to allowing light emitting diodes 203 and 205 to be lighted and others are not considered). Now, suppose automatic setting using the self-timer is explained. When the self-timer is actuated, E3 is 1, which is applied as input to AND circuit 211 through inverter 212, and therefore the output becomes 0. In this connection, the output of NAND circuits 34, 40 becomes 1, and the outputs of inverter 36, 42 become 1, thereby light emitting diodes 203, 205 will not be lighted. Of course, timing switch SW3 is then not made to open, and hence, the output of inverter 20-2 for delay circuit 20 is 1. Because of automatic setting, moreover, control line 2-1 is also 0 and the outputs of AND circuits 32, 38 are 0. And, 1 signal is applied as input through inverter 2-10 to the inputs of AND circuits 31, 37. Next, when E3 is inverted after completion of self-timer operation, the output of AND circuit 211 becomes 1, which is then applied as input to NAND circuits 34 and 40. If eight pulses are delivered and memorized in reversible counter 8, 1/1000 second is obtained for the time of exposure. Therefore, Q4 of counting stage 8-4 becomes 1 and other inputs of NAND circuit 407 are 1, and the output is 0. In addition, all the inputs of NAND circuit 408 are 1 and the outputs are 0. The output of NOR circuit 30 having these signals as inputs becomes 1 and is then given to AND circuit 31. The other input of AND circuit 31 has a 1 signal as mentioned above and the output 1 signal is delivered through OR circuit 33 to NAND circuit 34. And, since the other input of NAND circuit 34 receives a 1 signal as described above, the output of NAND circuit 34 becomes 0 making the output of inverter 36 0 by way of inverters 35, 36, thereby lighting light emitting diode 203 and displaying 1/1000 second shutter speed. And also, if thirty two pulses are applied as inputs to reversible counter 8, the time obtainable for exposure is 1/250 second. Then the output Q6 of counting stage 8-6 for reversible counter 8 becomes 1, and since all other inputs of NAND circuit 411 and NAND circuit 412 are 1, those outputs become 0 and the output of NOR circuit 43 becomes 1 which allows one input of NAND circuit 40 to be 1 through AND circuit 37, OR circuit 39. As mentioned above, the other input receives a 1 signal, and hence, the output of NAND circuit 40 becomes 0, thus making light emitting diode 205 light for display of 1/250 second through inverters 41 and 42.

Next, an explanation is given to the case of manual setting in which the self-timer is employed. Similarly as mentioned above, during actuation of the self-timer or while E3 is 1, light emitting diodes 201, 202 - 210 are not lighted, and at the same time, when E3 becomes 0 the light emitting diode for indicating the manual-set value selected is lighted. In case of manual setting, 1 signal is delivered to control line 2-1, and therefore the outputs of AND circuits 31 and 37 become 0, and the 1 signal of control line 2-1 is applied to one input of AND circuits 32, 38 and the outputs of inverters 302, 304 are delivered to the other input. The inputs of inverters 301, 302, — 307 are connected to the terminals 9-1M, 9-2M — 9-7M of auto manual transfer switch SW2 as shown in FIG. 3. Assume shutter speed is set to 1/1000 second. Then, terminal 9-2M is short-circuited by the movable contact piece 9-20M of auto manual transfer switch SW2, thereby making 9-2M 0, by which the output of inverter 302 becomes 1 and the output of AND circuit 32 becomes 1. An output 1 signal of AND circuit 32 is applied as input through OR circuit 33 to NAND circuit 34, the output of which is made 0. This 0 signal allows light emitting diode 203 to be lighted through inverters 35, 36. And, if shutter speed is set to 1/250 second, terminal 9-4M is short-circuited to 0, and therefore the output of inverter 304 becomes 1 and the output of AND circuit 38 becomes 1. This 1 signal is then delivered as an input through OR circuit 39 to NAND circuit 40, thereby permitting light emitting diode 205 to be lighted through inverters 41 and 42. In case of automatic setting where the self-timer is not employed, E3 becomes 0 concurrently with closing of power switch SW1, and the output of AND circuit 211 also becomes 1. Moreoever, memory actuation is made in synchronism with closing of power switch SW1, and therefore, eight pulses are applied to and memorized in reversible counter 8 similarly as set forth above, Q4 becomes 1 which makes the output of NAND circuit 407 0 and allows the output of NOR circuit 30 to be 1. Then the output of NAND circuit 34 is made 0 through NAND circuit 31 and OR circuit 33, thereby allowing the light emitting diode 203 to be lighted for display of 1/1000. In case of manual setting where the self-timer is not employed, E3 becomes 0 simultaneously with closing of power switch SW1 and makes the output of AND circuit 211 1, and the 1 signal is applied control line 201 as well. If the value as set by manual means of setting is, for example, 1/1000 second, the input of inverter 302 is caused to be 0, the output 1 signal which is applied as input through AND circuit 32 and OR circuit 33 to NAND circuit 34, to make the output 0, and thereby lighting light emitting diode 203 and displaying shutter speed 1/1000 second by way of inverters 35 and 36. However, if the value set by manual setting is less than 1/15 second it will not be displayed. A period of time for display these shutter speeds ends when timing switch SW3 is opened, and if the output of switching circuit 20-1 is inverted to 1 after opening of timing switch SW3, the output of inverter 20-2 becomes 0 and the output of AND circuit 211 becomes 0. For example, an explanation is made of the case in which one side input of NAND circuit 40 is 1. If the output of inverter 20-2 becomes 0 after opening of timing switch SW3 the output of AND circuit 211 becomes 0, the output of NAND circuit 40 becomes 1, and allows light emitting diode 205 to go out so as to make the output of inverter 42 through inverter 41. Light emitting diode 201 is lighted for display of overexposure warning (OVER) when the time of exposure is shorter than 1/2000 second, light emitting diode 209 is lighted for display of hand-vibration warning (UNDER) when the time of exposure is less than 1/15 second and light emitting diode 210 is lighted for display of exposure limits (OVERFLOW) when the time of exposure is longer than the longest exposure time controllable by this control circuit.

Figure 5:
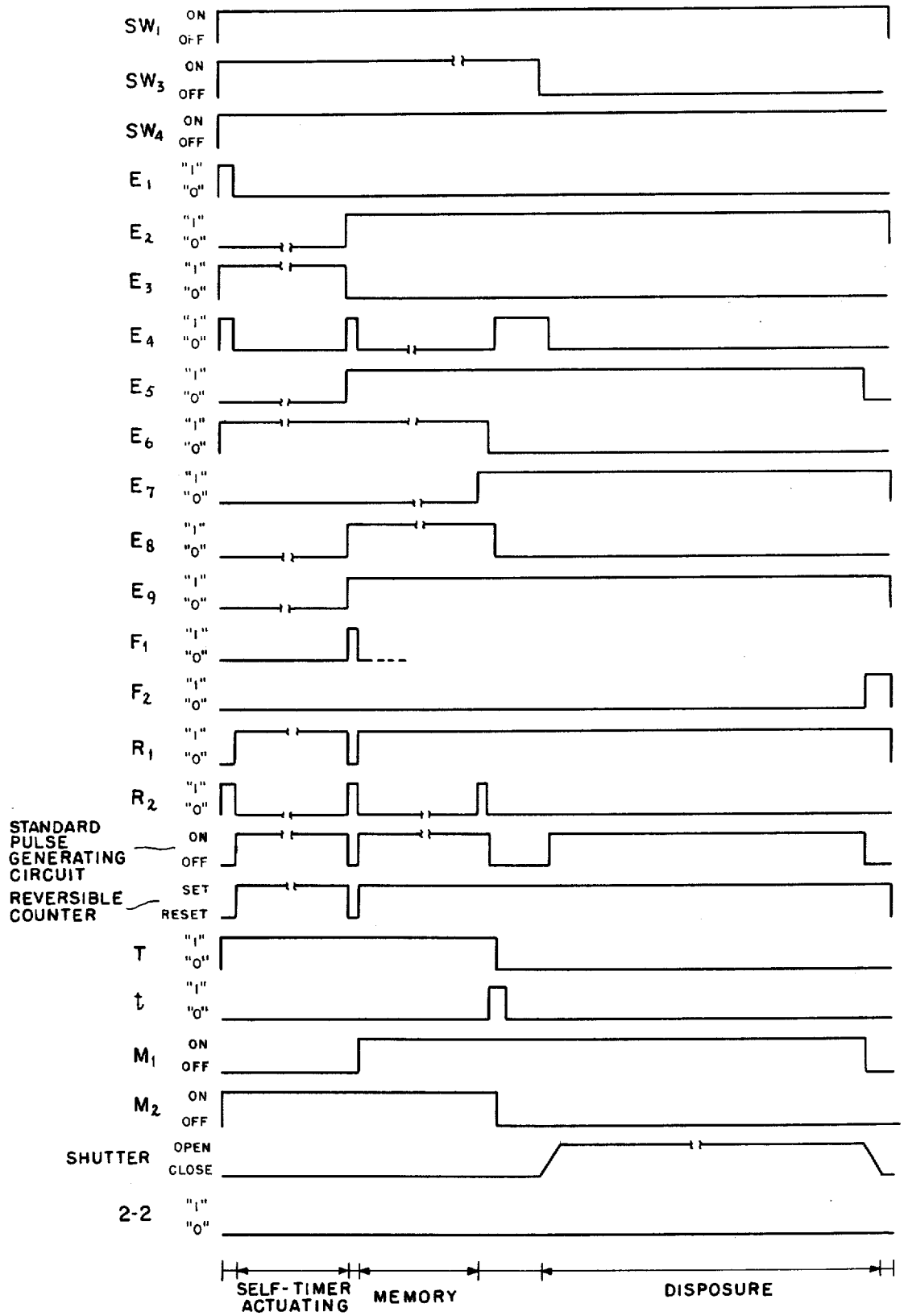
Figure 6:
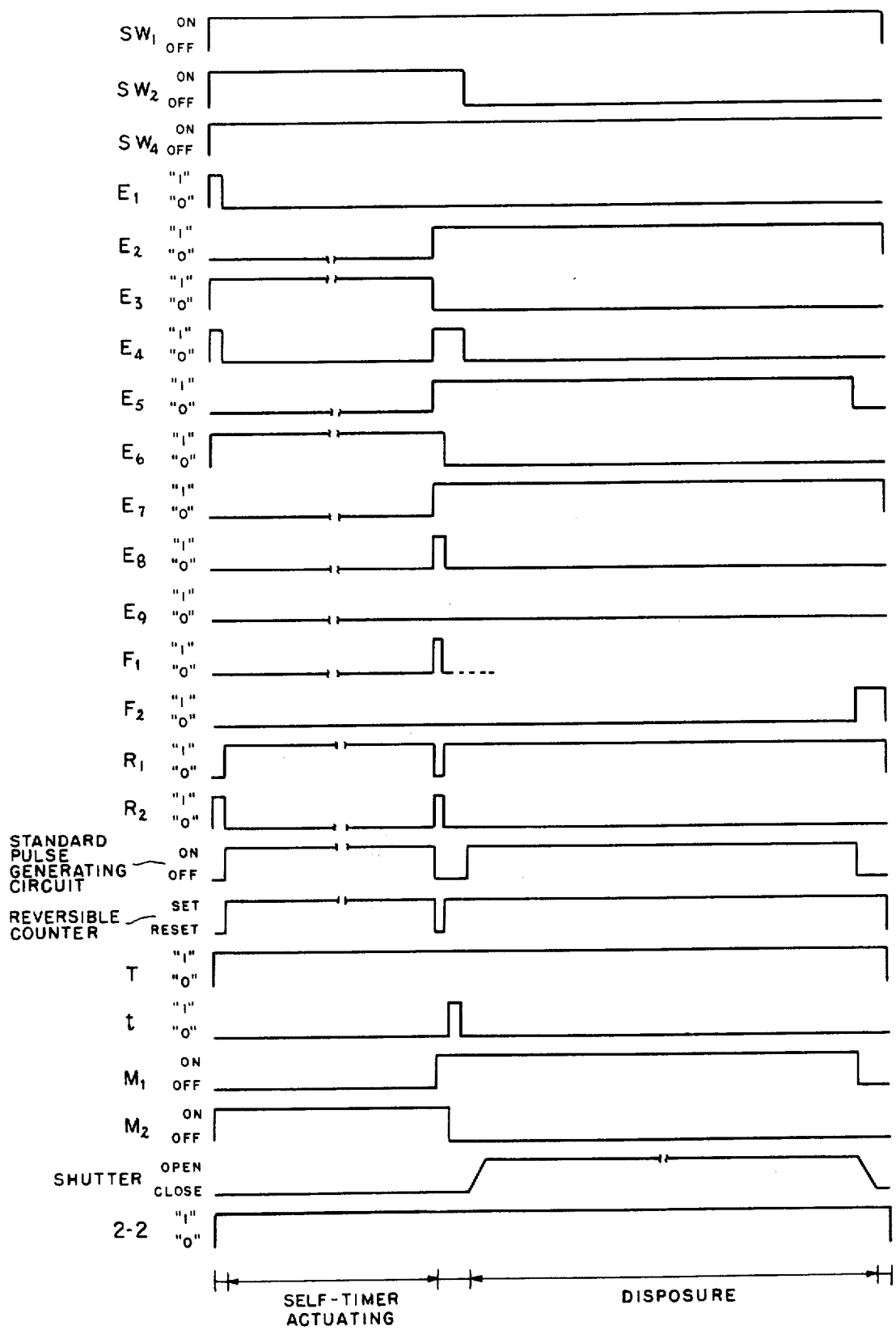
Figure 7:
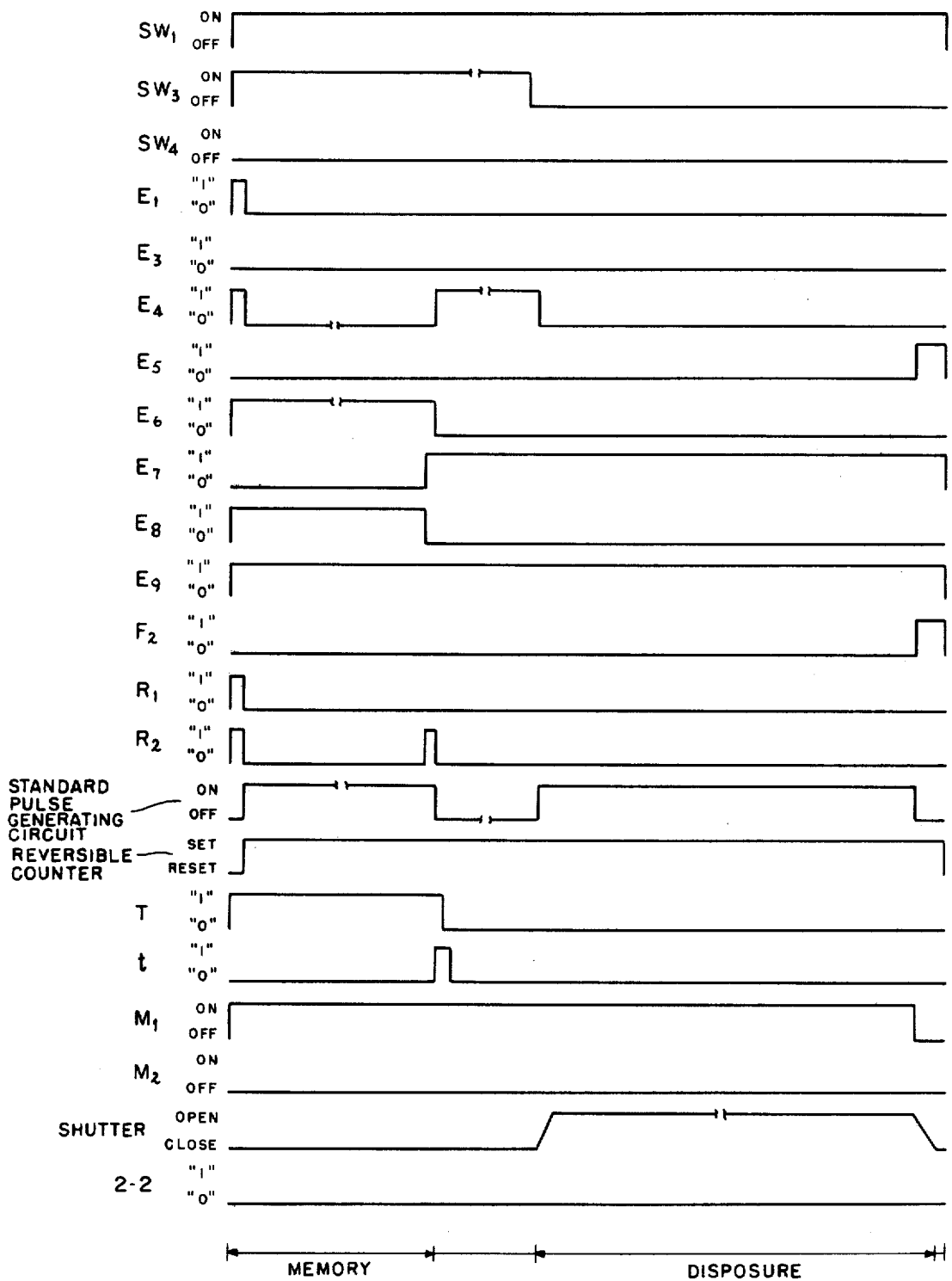
Figure 8:
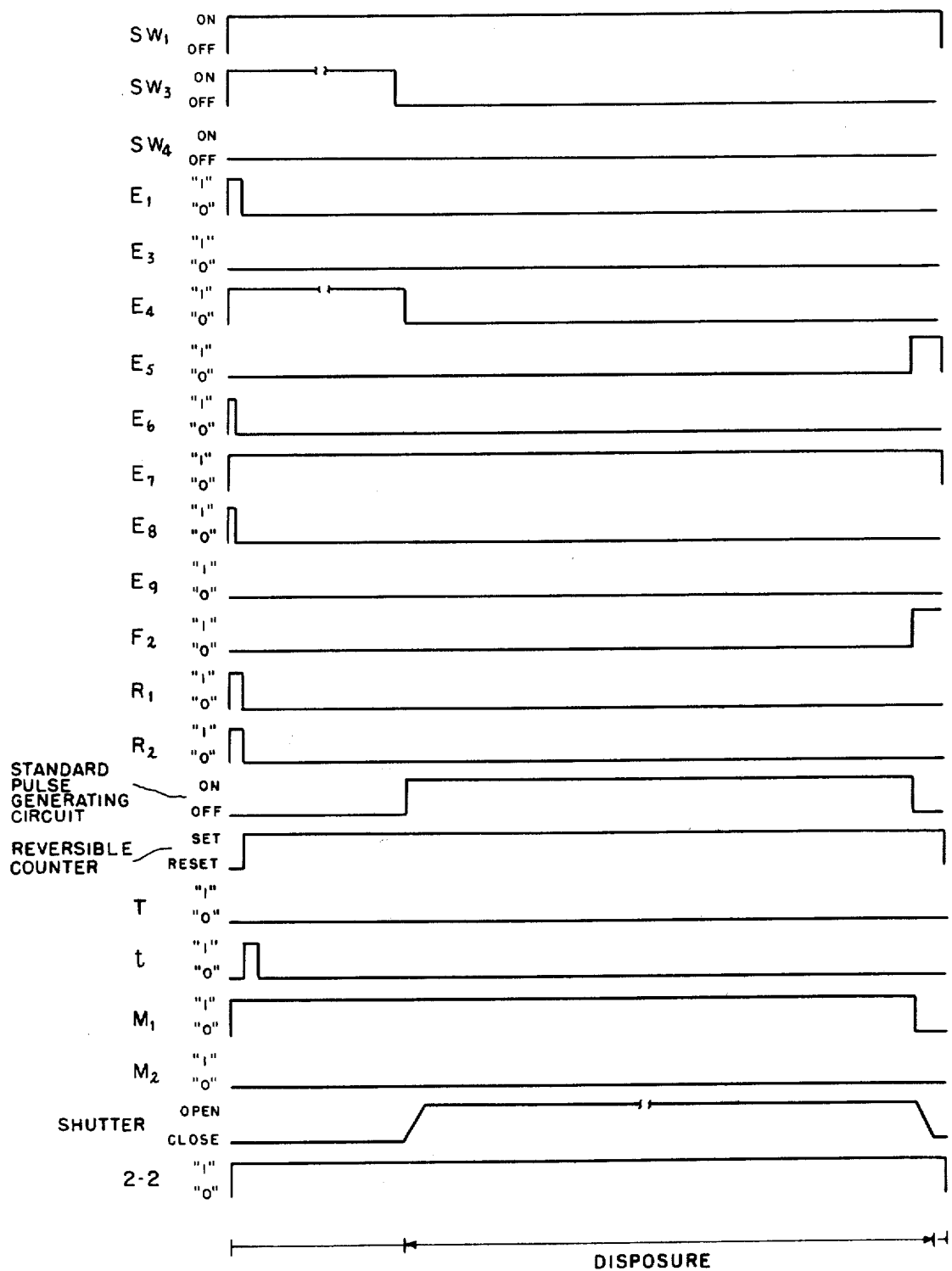

FIG. 5 is timing diagram showing the actuating state and signal levels relative to respective switches, circuits, control terminals, shutter, etc. in the case of automatic setting in which the self-timer is employed, FIG. 6 shows the same in the case of manual setting where the self-timer is employed FIG. 7 shows the same in the case of automatic setting where the self-timer is not employed and FIG. 8 shows the same in the case of manual setting where the self-timer is not employed. E1, E2, — E9, F1, F2, R1, R2 show signal levels at respective points of E1, E2 — E9, F1, F2, R1, R2 in FIG. 2.

As mentioned above, the present invention has the excellent advantages described below because, in the electric shutter control circuit using a digital memory reproducing system such that pulses generated in the pulse generating circuit are memorized in the counting circuit by counting only the number which correspond to the brightness of a subject and the time of exposure is controlled according to the memory value as memorized in the above-said counting circuit in conformity with the start of a shutter, the standard pulses with definite frequencies produced by the pulse generating circuit are divided through the counting circuit when the self-timer is actuated and memorized after elapse of an actuating time by the self-timer and a signal for starting the shutter opening is generated after completion of memorization.

A. Since the self-timer actuating time and the time of exposure are controlled by one identical control circuit, it is not necessary to provide the self-timer with a special time control circuit.

B. A transfer means for shifting to controlling the time of exposure when self-timer is employed and after completion of self-timer is realized entirely by electric switches which are most reliable.

C. The system is such that the brightness of a subject is memorized when the self-timer is employed, and after completion of self-timer and the mirror-up raising action the time of exposure is controlled by the most current information on the brightness of a subject when self-timer is employed and exposure accuracy is very high.

It is needless to say that variety of means shown in the embodiments of the present invention are not limited only to the embodiments For example, as for the method by which the brightness of a subject is memorized in the counting circuit, the embodiment for the present invention is such that the time being in inverse proportion to the brightness of a subject is generated by the brightness time conversion circuit, within the time of which the standard pulses with a definite frequency are produced from the standard pulse generating circuit and then counted and memorized by the counting circuit. However, the present invention can be realized even by a system wherein the standard pulses with a definite frequency are in inverse proportion to the brightness of a subject as already made known under the patent application No. Sho 45-4903, and are counted by a counting circuit during a a given time. The requirement is to generate the standard pulses with a definite frequency by means of change-over switches only when the self-timer is to be employed

We claim:

1. A digital exposure time control circuit comprising: a pulse generating circuit for generating standard pulses at a substantially constant rate; a dividing circuit for developing output pulses having a lower repetition rate than standard pulses applied thereto; brightness-time conversion circuit means connecting said pulse generating circuit to said dividing circuit and operable for applying to said dividing circuit a number of standard pulses inversely proportional to the brightness of a scene to be photographed, whereby the number of standard pulses are proportional to an exposure time; a reversible counter operable in a counting mode for counting pulses applied thereto and operable in a read-out mode for reading out the counted pulses to control an exposure time; means for applying dividing circuit output pulses to said reversible counter to count the dividing circuit output pulses when said reversible counter is operated in the counting mode; second means operable for applying standard pulses to said dividing circuit thereby to effect counting of dividing circuit output pulses by sid reversible counter when said reversible counter is operated in the counting mode; a self-timer control circuit responsive to the number of counted pulses for clearing said reversible counter, for disabling said second means for applying standard pulses to said dividing circuit, and for enabling said brightness-time conversion circuit means when the number of counted pulses exceeds a predetermined number which corresponds to a predetermined delay time, whereby said reversible counter counts the number of pulses proportional to an exposure time to control an exposure time after a delay determined by the time required to count the predetermined number of pulses to which self-timer control is responsive.

* * * * *